(12) United States Patent
Vogele

(10) Patent No.: US 12,478,440 B2
(45) Date of Patent: Nov. 25, 2025

(54) MEDICAL ROBOT

(71) Applicant: iSYS Medizintechnik GmbH, Kitzbühel (AT)

(72) Inventor: Michael Vogele, Schwabmünchen (DE)

(73) Assignee: iSYS Medizintechnik GmbH, Kitzbühel (AT)

( * ) Notice: Subject to any disclaimer, the term of this patent is extended or adjusted under 35 U.S.C. 154(b) by 880 days.

(21) Appl. No.: 15/733,719

(22) PCT Filed: Apr. 12, 2019

(86) PCT No.: PCT/EP2019/000118
§ 371 (c)(1),
(2) Date: Oct. 2, 2020

(87) PCT Pub. No.: WO2019/197056
PCT Pub. Date: Oct. 17, 2019

(65) Prior Publication Data
US 2021/0015564 A1    Jan. 21, 2021

Related U.S. Application Data

(60) Provisional application No. 62/657,271, filed on Apr. 13, 2018.

(51) Int. Cl.
*A61B 34/30* (2016.01)
*A61B 90/11* (2016.01)
*B25J 9/00* (2006.01)

(52) U.S. Cl.
CPC .............. *A61B 34/30* (2016.02); *A61B 90/11* (2016.02); *B25J 9/0009* (2013.01); *A61B 2034/301* (2016.02)

(58) Field of Classification Search
CPC ... A61B 34/30; A61B 90/11; A61B 2034/301; A61B 2017/00477; A61B 2017/00486;
(Continued)

(56) References Cited

U.S. PATENT DOCUMENTS 5,943,914 A * 8/1999 Morimoto .............. A61B 34/76
414/2
6,723,106 B1    4/2004 Charles et al.
(Continued)

FOREIGN PATENT DOCUMENTS

CN    1843304 A    10/2006
CN    101069964 A    11/2007
(Continued)

*Primary Examiner* — Tan-Uyen T Ho
*Assistant Examiner* — Bridget E. Rabaglia
(74) *Attorney, Agent, or Firm* — Smartpat PLC

(57) ABSTRACT

A compact medical robot provides guidance and actuation of a medical instrument with five or more degrees of freedom. The robot has a lower actuator arm movable within a lower plane. A lower gimbal mount is attached to the lower actuator arm. An upper actuator arm is movable within an upper plane and an upper gimbal mount is attached to the upper actuator arm. A guide tube is attached to the lower gimbal mount and to the upper gimbal mount. A linear actuator is attached to the guide tube to longitudinally move a medical instrument which extends through the guide tube. The linear actuator includes an actuating rod and a linear motor arranged within a main body portion of the linear actuator. An additional rotational actuator for rotating the medical instrument may be provided and firmly connected to the actuating rod.

12 Claims, 21 Drawing Sheets

(58) Field of Classification Search
CPC ...... A61B 2017/3409; A61B 2090/571; A61B 8/4218; A61B 2034/302; A61B 2034/303; A61B 2034/305; A61B 34/35; B25J 9/0009; B25J 9/0087; B25J 9/009; B25J 9/0096

See application file for complete search history.

(56) References Cited

U.S. PATENT DOCUMENTS

| | | | |
|---|---|---|---|
| 9,095,686 | B2 | 8/2015 | Zanne et al. |
| 2002/0133174 | A1 | 9/2002 | Charles et al. |
| 2004/0162564 | A1 | 8/2004 | Charles et al. |
| 2007/0250078 | A1* | 10/2007 | Stuart .................... A61B 34/20 606/130 |
| 2007/0276407 | A1 | 11/2007 | Vogele |
| 2013/0123802 | A1* | 5/2013 | Comber ................ A61B 34/30 606/130 |
| 2015/0090063 | A1 | 4/2015 | Lantermann et al. |
| 2015/0374360 | A1* | 12/2015 | Scheib ................ A61B 17/105 227/175.1 |
| 2016/0317240 | A1 | 11/2016 | Vogele |
| 2017/0246024 | A1 | 8/2017 | Vogele |
| 2018/0303569 | A1 | 10/2018 | Vogele |
| 2019/0192245 | A1 | 6/2019 | Abbott et al. |

FOREIGN PATENT DOCUMENTS

| | | | |
|---|---|---|---|
| CN | 101421080 A | 4/2009 | |
| CN | 101869941 A | 10/2010 | |
| CN | 102727304 A | 10/2012 | |
| CN | 107773305 A | 3/2018 | |
| JP | 2010524634 A | 7/2010 | |
| JP | 2016539749 A | 12/2016 | |
| WO | WO-0030557 A1 * | 6/2000 | ............. A61B 34/30 |
| WO | 02062199 A2 | 8/2002 | |
| WO | WO-2016177463 A1 * | 11/2016 | ......... A61B 17/3403 |
| WO | 2018053305 | 3/2018 | |

* cited by examiner

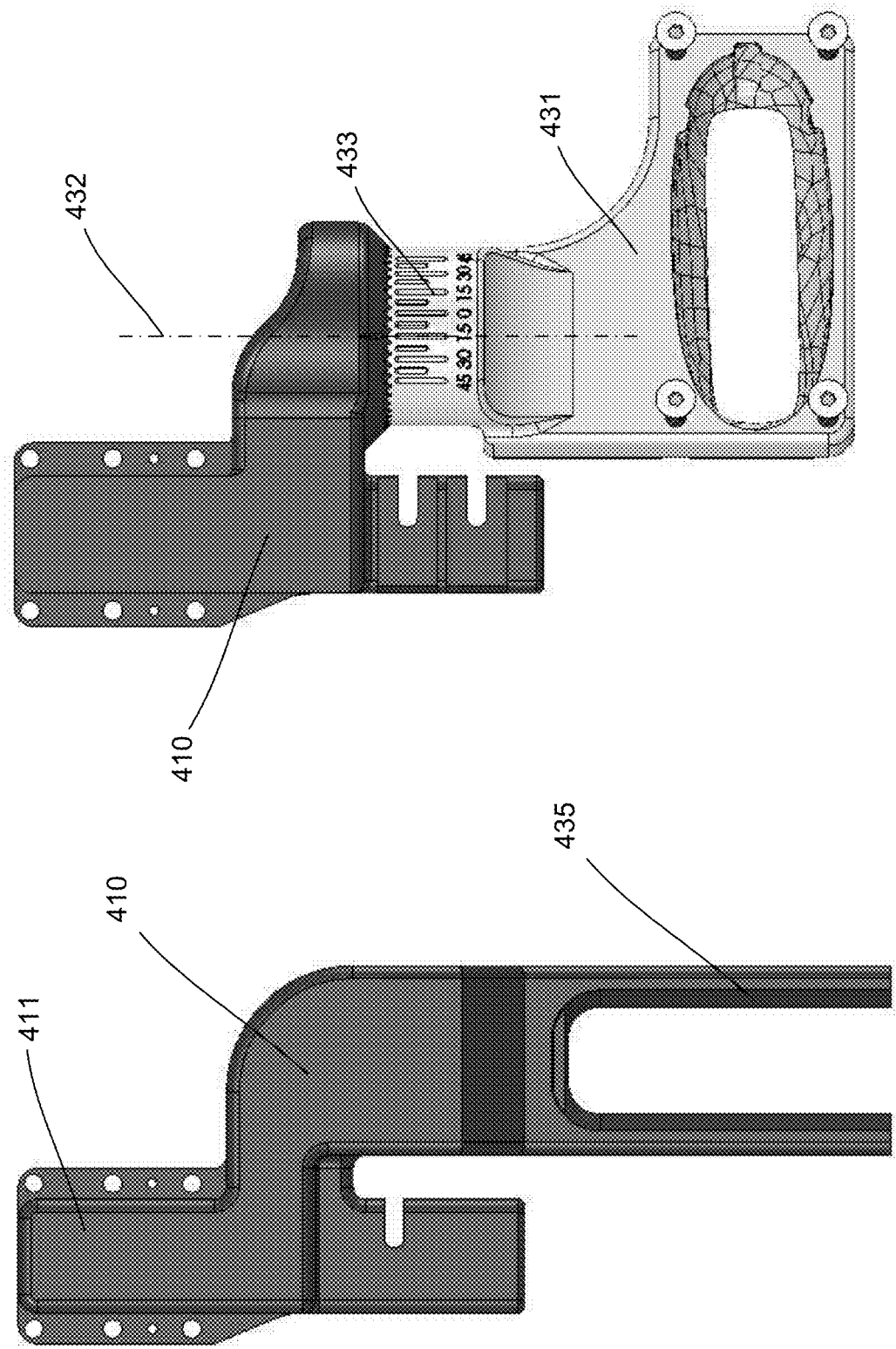

MEDICAL ROBOT

TECHNICAL FIELD

The present invention generally relates to a medical robot, and more particularly, to a compact remotely controllable interventional device guidance system for image-guided interventions.

BACKGROUND

Robotically-assisted surgery uses robotic systems to aid in surgical procedures. Robotically-assisted surgery was developed to overcome the limitations of pre-existing minimally-invasive surgical procedures and to enhance the capabilities of surgeons performing open surgery. In the case of robotically-assisted minimally-invasive surgery, instead of directly moving an instrument, the surgeon controls the instruments either through direct telemanipulation or through computer control. This allows the surgeon to be remote from the patient, enabling image-guided procedures where the robot is present within an imaging device such at a computer tomography (CT) scanner or a magnetic resonance imaging (MRI) device without exposing the surgeon to radiation.

Medical robots have proven their worth in many surgical or stereotactic operations with precise controlling of points on or in the body. By combining instrument guidance with medical imaging it has become possible to precisely determine the entrance locations, entrance depths and entrance directions of the medical instrument to reach a defined target point on or in the body.

Conventional medical robots are expensive, large, and bound to a massive frame, e.g. mounted to the ceiling of an operating room. Variability of such conventional robots is often limited. A compact and lower cost device for controlling corporeal structures in disclosed in the inventor's US patent application publication 2007/0276407 which is hereby incorporated by reference thereto in its entirety. The present disclosure provides additional improvements over the device described in US 2007/0276407.

SUMMARY

An improved medical robot comprises a lower actuator arm movable within a lower plane. A lower gimbal mount is attached to the lower actuator arm. The lower gimbal mount provides at least two degrees of freedom, allowing pitch and roll within the lower plane. An upper actuator arm is movable within an upper plane. An upper gimbal mount is attached to the upper actuator arm. The upper gimbal mount provides at least two degrees of freedom allowing pitch and roll within the upper plane. A guide tube is attached to the lower gimbal mount and to the upper gimbal mount. A linear actuator is attached to the guide tube and adapted to longitudinally move a medical instrument which extends through the guide tube.

The guide tube may be firmly attached to the lower gimbal mount and slidably arranged within the upper gimbal mount. More specifically, the lower gimbal mount may have an inner gimbal element with a threaded opening through which a screw clamps a lower end of the guide tube to the inner gimbal element.

The medical robot can be easily reconfigured for use in a wide range of applications. Reconfigurability is achieved by use of differently shaped instrument adaptors. The medical robot may use a lower instrument adaptor having a rear portion which is firmly attached to the lower actuator arm. An attachment mechanism in form of a receiving opening which receives an attachment shaft of the lower gimbal mount is provided in a forward portion of the instrument mount. Similarly, an upper instrument adaptor having a rear portion which is firmly attached to the upper actuator arm and a receiving opening which receives an attachment shaft of the upper gimbal mount may be used. The lower and upper instrument adaptors can be provided in various forms, allowing the medical robot to be reconfigured for different medical procedures which require different instruments, a different number of instruments, and different relative arrangements of these instruments.

The attachment shafts of the lower gimbal mount and the upper gimbal mount may comprise one or more circumferential grooves. The attachment shafts of the lower gimbal mount and the upper gimbal mount may be retained within the respective receiving openings of the lower instrument adaptor and the upper instrument adaptor by one or more spring-loaded securing brackets each. The spring-loaded securing brackets may have retaining pins which engage the one or more circumferential grooves. The spring-loaded securing brackets may pull the attachment shafts towards one side of the respective receiving openings. The attachment shafts are thus biased into a fixed position, yet able to rotate around their longitudinal axes within the receiving openings.

The linear actuator which is attached to the guide tube may have a lower body portion which extends around an upper end of the guide tube and a main body portion which is arranged at a lateral offset from the lower body portion. In particular, a receiving opening may be formed within the lower body portion of the linear actuator. A clamping mechanism, e.g. in form of a clamping screw, may be provided to securely clamp the lower body portion of the linear actuator to the upper end of the guide tube. The medical instrument may extend through the lower body portion of the linear actuator.

The linear actuator may comprise an actuating rod and an instrument clamp firmly attached to the actuating rod. A linear motor may be arranged within a main body portion of the linear actuator and adapted to move the actuating rod. The linear motor may be a piezo-electrical linear actuator. A longitudinal axis of the actuating rod may extend radially offset from and in parallel with a longitudinal axis of the guide tube.

Instead of a fixed instrument clamp, an optional rotational actuator may be firmly connected to the actuating rod. The rotational actuator then provides rotational movement of the instrument around its longitudinal axis. The rotational actuator may comprise a pinion gear with a central opening through which the medical instrument can be inserted and into which the medical instrument can be releasably clamped. The rotational actuator may further comprise a gear rack which engages the pinion gear, the gear rack being adapted to be moved by a linear motor arranged within a housing of the rotational actuator.

Another exemplary medical robot may comprise a lower body. A lower actuator arm may extend through an opening of the lower body, the lower actuator arm being movable within a lower plane. The robot may further comprise an upper body and an upper actuator arm extending through an opening of the upper body. The upper actuator arm may be movable within an upper plane. The lower plane and the upper plane may be parallel. A guide tube may be connected to the lower actuator arm and to the upper actuator arm. A linear actuator may be attached to the guide tube. The linear actuator may be adapted to move an instrument clamp which is arranged above guide tube. Alternatively, a rotational actuator may be attached to the linear actuator instead of a fixed instrument clamp.

The upper body of the medical robot may be attached to the lower actuator arm and move relative to the lower body. Alternatively, the upper body of the medical robot may be immovably attached to the lower body.

A positioning frame with positioning markers may be firmly attached to the guide tube. The position frame and positioning markers may be observed by a medical guidance system which is operatively connected to a control system of the robot.

A method for using the medical robot may comprise: arranging the medical robot immovably relative to an incision point in a patient; inserting a medical instrument into the guide tube and clamping the medical instrument to the instrument clamp; controlling the lower actuator arm and the upper actuator arm to position and orient the medical instrument such that a path of the medical instrument is aligned with a target within the patient; and controlling the linear actuator to drive the medical instrument along the path into the target.

A medical robot may comprise a lower body and a lower actuator arm extending through an opening of the lower body. The lower actuator arm may be movable within a lower plane. A lower instrument adaptor may be attached to the lower actuator arm. The lower instrument adaptor may have a first attachment mechanism which retains a lower guide for a first instrument and a second attachment mechanism which retains a lower guide for a second instrument. The reference to a "lower" element (e.g. lower body, a lower plane, a lower instrument adaptor, etc.) has been chosen for clarity of description in case an "upper" element is present. However, the presence of an "upper" element should not be inferred just because a "lower" element has been mentioned. Similarly, the reference to "a first" element does not mandate the presence of a "second element" unless such a "second element" is specifically mentioned.

The lower guide for the first instrument may be a gimbal which secures an x/y position of the first instrument within the lower plane and allows pitch and roll movement of the first instrument around the x/y position. The lower guide for the second instrument may be identical to the lower guide for the first instrument. Alternatively, the lower guide for the second instrument may have a different shape, and be e.g. in form of a bracket.

The first instrument may be a biopsy needle, an injection needle, an electrode, an endoscope, or an exoscope. The second instrument may a medical imaging device. More specifically, the second instrument may be an ultrasonic transducer. Generally, the medical robot may be used with any type of instrument used in surgery, and is preferably used with medical instruments used in minimally invasive robotic surgery.

The second attachment mechanism and the lower guide for the second instrument may comprise releasably connected crown gears. Thereby, a roll angle of the second instrument can be adjusted by engaging the crown gears in different relative positions. The lower guide for the first instrument and the lower guide for the second instrument may be arranged at a predetermined distance.

The lower instrument adaptor may further comprise a third attachment mechanism which retains a lower guide for a third instrument. In that case, the first instrument may be a first electrode and the third instrument may be a second electrode. The first electrode and the second electrode may be connected to an electric signal generator to perform an ablation.

The medical robot may further comprise an upper body and an upper actuator arm extending through an opening of the upper body. The upper actuator arm may be movable within an upper plane, which may be parallel to the lower plane. An upper instrument adaptor may be attached to the upper actuator arm. The upper instrument adaptor may have an attachment mechanism which retains an upper guide for the first instrument.

Another exemplary medical robot may comprise a lower body and a lower actuator arm extending through an opening of the lower body. The lower actuator arm may be movable within a lower plane. A lower instrument adaptor may be attached to the lower actuator arm. The lower instrument adaptor may have a first attachment mechanism which retains a lower guide for a first instrument and a sterile barrier arranged between the first instrument and the lower body. The sterile barrier may be arranged between the lower guide for the first instrument and the lower instrument adaptor. The sterile barrier may be a sterile bag having a grommet which clips onto the lower instrument adaptor or the lower guide.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

FIG. 4 shows an exemplary lower instrument adaptor for use with a medical robot.

FIG. 5 shows an alternative lower instrument adaptor for use with a medical robot.

DETAILED DESCRIPTION

Figure 1:
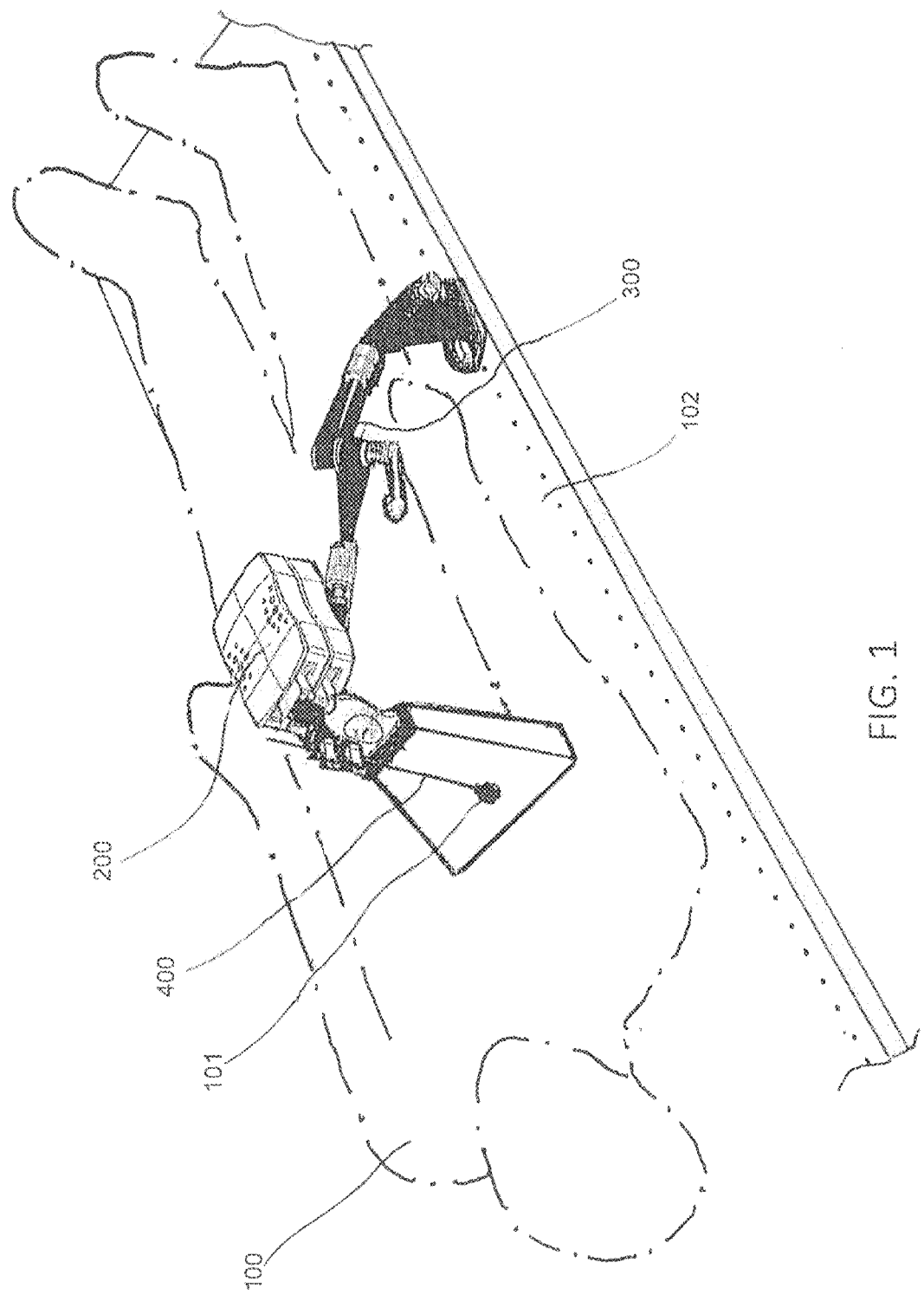
FIG. 1 is an overview illustration showing a compact medical robot in use.
Figure 2:
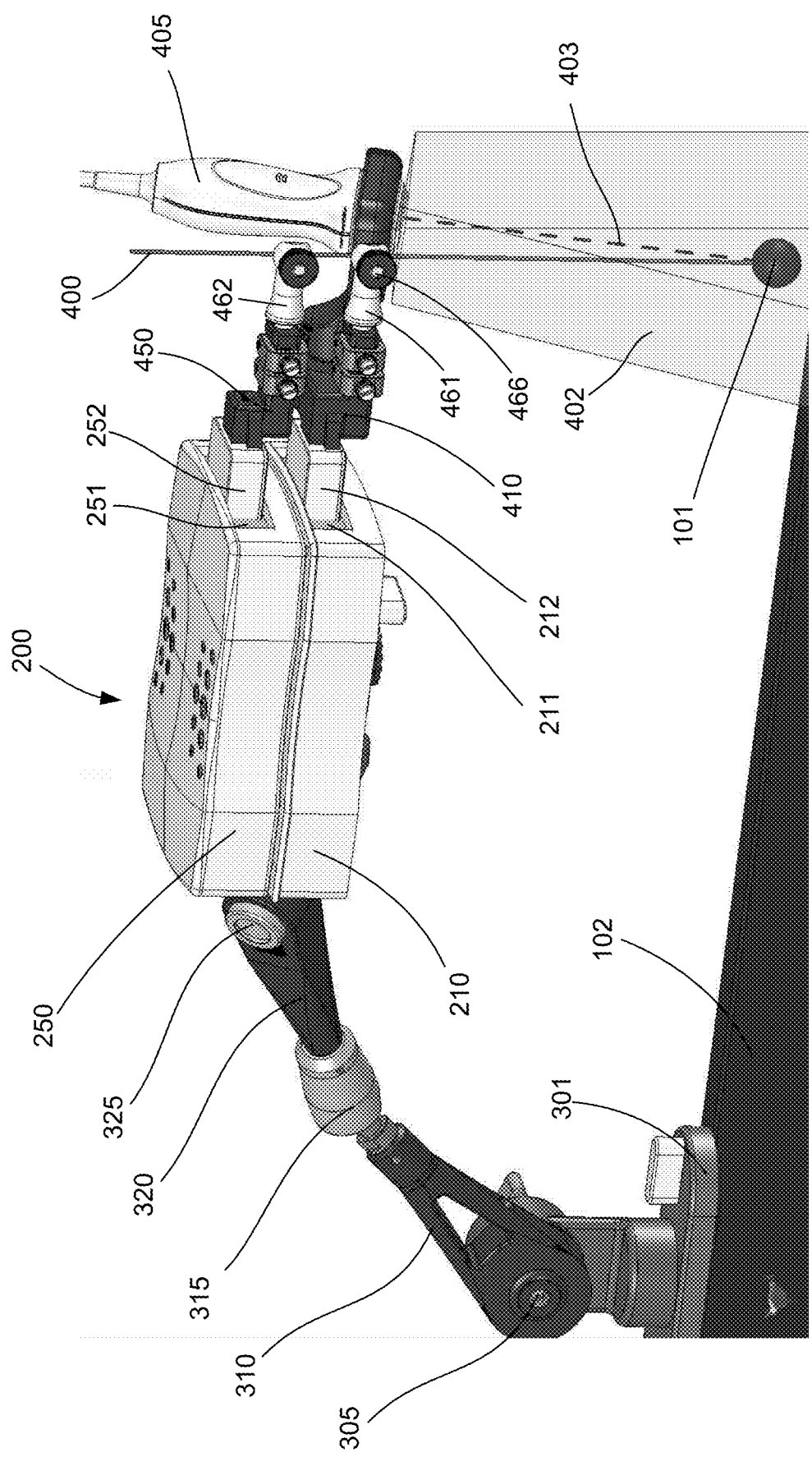
FIG. 2 is perspective view showing the medical robot as in FIG. 1 attached to a patient table with an adjustable arm.
Figure 3:
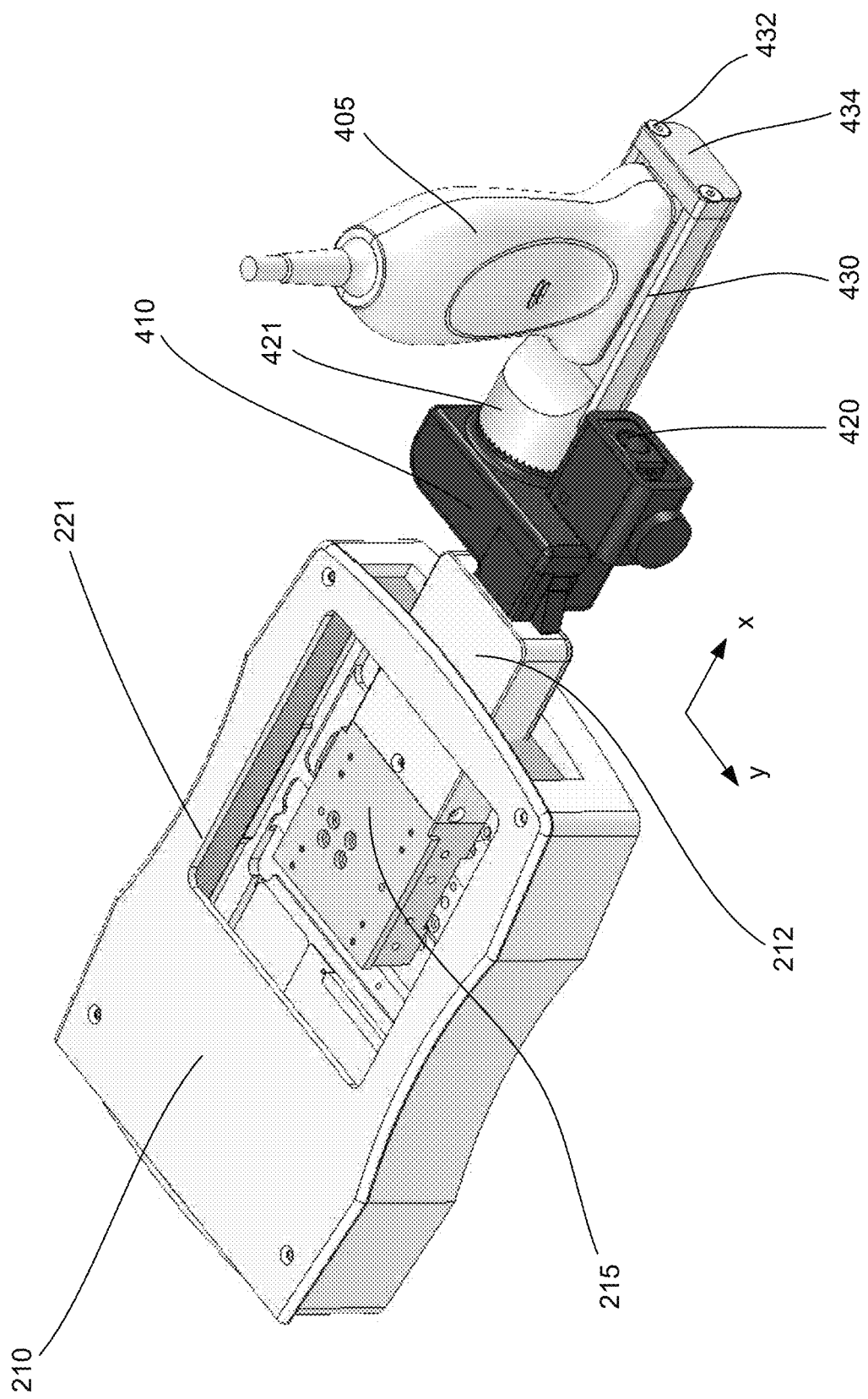
FIG. 3 is a perspective view showing a lower portion of a compact medical robot.

Referring to FIG. 1, a medical robot 200 is shown in use. The robot 200 is connected to a patient table 102 with an adjustable arm 300. A patient 100 on the patient table 102 is shown in phantom lines. To restrict movement, the patient 100 may be secured to the patient table 102 with a device for immobilization (not shown) as described in US patent application publication 2017/0246024. The robot 200 is used to guide an instrument 400 to a target 101 within the patient 100. The robot 200 can control the path of the instrument 400 within an x/y plane. This specification will refer to forward and backward movement relative to the body of the robot 200 as movement along an x-axis. Left and right movement will be referred to as movement along a y-axis. The robot 200 can further control the pitch and roll of the path of the instrument 400. This specification will refer to pitch as rotation around the y-axis and to roll as rotation around the x-axis. The robot 200 as shown in FIG. 1-3 can adjust four degrees of freedom and may therefore be referred to as a 4-axis robot. Namely, the 4-axis robot can adjust the x- and y-position of the instrument 400 in a plane, as well as pitch and roll of the instrument 400 relative to the plane.

The instrument 400 may be a biopsy needle to retrieve a tissue sample from a target such as a suspicious mass, a lump, an infection or an inflammation. The instrument 400 may also be an injection needle for targeted application of a drug. The instrument 400 may further be an endoscope, an exoscope, or the like. The instrument 400 may be one of several needle electrodes used in an ablation. More generally, the robot 200 may be used to guide any kind of instrument into a target 101, the instrument being manually pushed along its longitudinal axis by a surgeon. The robot 200 may be used to support percutaneous interventions like tumor ablations (RF, IRE, CRYO, BRACHY), soft tissue and bone biopsy, direct drug injection, endoleak treatment, shunt replacement, marker and guide wire placement, among others. The medical robot 200 has been found to be particularly beneficial in brain surgery.

The patient table 102 may be part of or be used with a medical imaging device (not shown) such as a CT scanner or an MRI device. The robot 200 may be used to direct the instrument 400 towards the target 101 while the imaging device is active. A surgeon can so observe both the position of the target 101 and the position of the instrument 400 to control the robot 200 and adjust his manual movement of the instrument 400. For use in an MRI the robot 200 may be designed to not include any ferromagnetic components or components that are influenced by a strong magnetic field. More specifically, for use within an MRI device the robot 200 may utilize plastic components, made e.g. of a thermoplastic polymer such as PEEK instead of metal components and may use piezo actuators instead of electric motors that are based on magnetic fields.

Referring now to FIG. 2, the robot 200 is shown in a more detailed close-up view. The adjustable arm 300 connects the robot 200 to the patient table 102 in an adjustable manner. As shown, the adjustable arm 300 has a lower arm 310 which is connected to an upper arm 320 by a locking ball joint 315. The lower arm 310 is attached to a mounting bracket 301 which is securely fastened to the patient table 102. The lower arm 310 may pivot around a lockable lower pivot axis 305. The robot 200 may be attached to the upper arm by a bracket 330 which may pivot around a lockable upper pivot axis 325.

The robot 200 includes a lower body 210 and an upper body 250. As shown in even more detail in FIG. 3, arranged within the lower body 210 are linear actuators which provide movement of a lower actuator arm 212 in a lower x/y plane. The lower actuator arm 212 extends through a frontal opening 211 of the lower body 210. The lower actuator arm 212 can move forward/backward and left/right relative to the lower body 210. Preferably, when in use, the adjustable arm 300 is positioned such that the x/y plane of the robot 200 is arranged approximately tangential with the incision surface through which the instrument 400 is introduced into the patient 100. Approximately tangential is understood to include orientations of the x/y plane within +−30° pitch and +−30° roll of being parallel and preferably within ±15° pitch and ±15° roll of being parallel with the body of the patient 100 at the incision where the instrument 400 penetrates the patient's skin.

The upper body 250 of the robot 200 may be rigidly connected to an actuator body 215 within the lower body 210. For that purpose, the lower body 210 has a cutout 221 through which fastening elements connect the upper body 250 to the movable actuator body 215. That is, the upper body 250 moves relative to the lower body 210 jointly with the lower actuator arm 212.

In an alternative configuration, the upper body 250 may be rigidly connected to the lower body 210. The cutout 221 is not needed in this alternative configuration. In either configuration, the upper body 250 has a frontal opening 251 through which an upper actuator arm 252 extends. The upper actuator arm 252 is movable in an upper x/y plane parallel to the lower x/y plane.

The lower actuator arm 212 and the upper actuator arm 252 each have an adaptor socket which is configured to receive and retain a lower instrument adaptor 410 and upper instrument adaptor 450, respectively.

Figure 10:
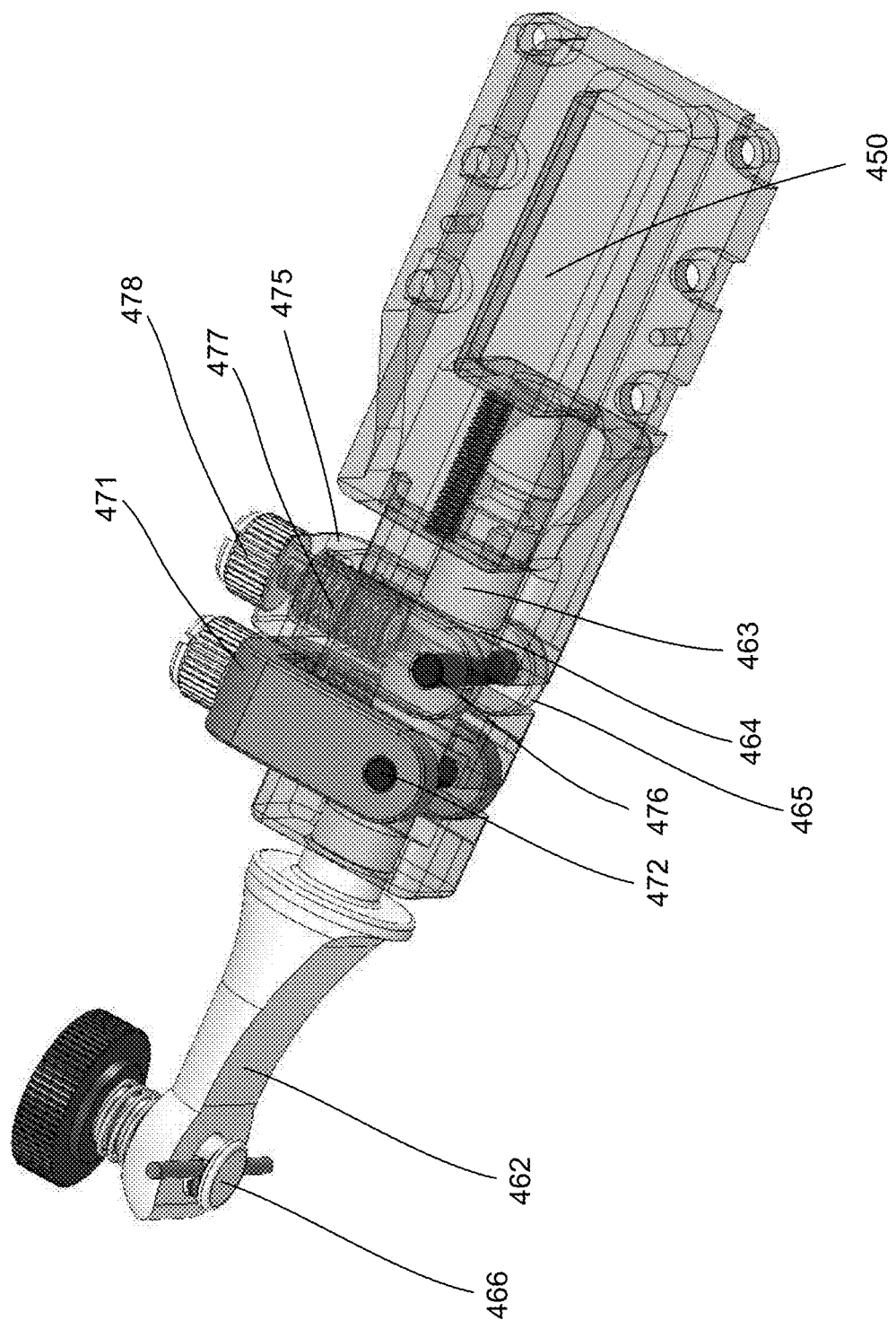
FIG. 10 is a detailed view of an instrument guide within an instrument adaptor.

FIG. 10 shows a detailed view of an upper instrument adaptor 450 (shown semi-transparent) into which an attachment shaft 463 of an upper guide member 462 has been inserted. The attachment shaft 463 is securely and rotatably retained within a longitudinal receiving opening 420 of the upper instrument adaptor 450 by two securing brackets 471, 475. One of the securing brackets 475 is shown semi-transparent in FIG. 10. The securing brackets 471, 475 include retaining pins 472, 476 which engage corresponding circumferential grooves 464 within the attachment shaft 463. Each securing bracket 471, 475 includes a spring 477 which biases the securing bracket 471, 475 and its associated retaining pins 472, 476 within a slot 465 of the upper instrument adaptor 450. The slot 465 extends perpendicular to the longitudinal receiving opening 420 of the upper instrument adaptor 450. The use of two redundant securing brackets 471, 475 has been found superior to the use of a single securing bracket. Two securing bracket provide inherent redundancy which is desirable in the safety critical use of guiding a medical instrument within a patient's body. Also, the use of two securing brackets 471, 475 reduces positional tolerances by pulling the attachment shaft 463 towards one side of the receiving opening 420 of the upper instrument adaptor 450 with higher force than provided by a single spring and bracket combination. The use of two securing brackets also reduces longitudinal tolerances of the attachment shaft 463.

A visual position indicator may be provided on each of the two securing brackets 471, 475. The visual indicators of the two securing brackets 471, 475 may be aligned only if the retaining pins 472, 476 of both brackets correctly engage the respective grooves in the attachment shaft 463, thus providing a visual indication that the attachment shaft 463 has been correctly retained within the instrument adaptor 450 when both visual indicators align.

Figure 11:
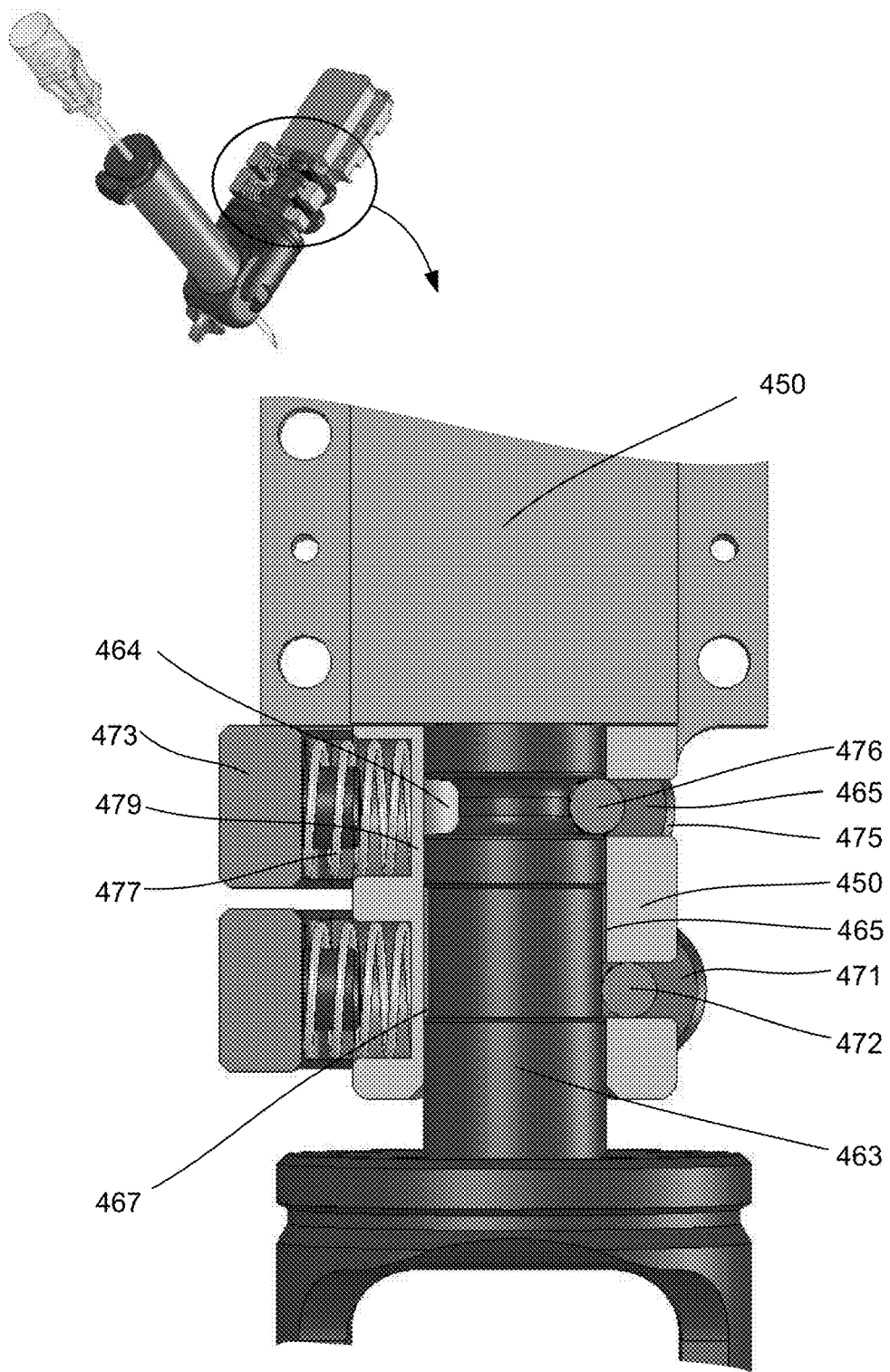
FIG. 11 is a detailed cross section through an attachment mechanism retaining an instrument guide within an instrument adaptor.

Referring now to FIG. 11, a partial cross-sectional view of an instrument adaptor 450 is shown. For orientation, a small perspective view identifying the location of the cross sectional view is provided. As shown, the attachment shaft 463 of the guide member 462 is secured within the receiving opening 420. The attachment shaft 463 has a first circumferential groove 464 which is narrower and deeper than a second circumferential groove 467. A first securing pin 476 is pulled into the first groove 464 by the first securing bracket 475. The first securing pin can slide within a slot 465 that is perpendicular to the receiving opening 420. The first securing bracket 475 is spring loaded by a first spring 477. The spring 477 is arranged between a wall 479 of the receiving opening 420 and a base 473 of the generally U-shaped securing bracket 475. The wall 479 is an integrally formed part of the instrument adaptor 450. A threaded opening within the base 473 of the securing bracket 475 can accept a safety screw 478 (shown in FIG. 10 but not in FIG. 11). After the guide member has been inserted into the instrument adaptor and the pins 472, 476 rest in their respective grooves 464, 467, the safety screws 478 may be fastened to prevent the securing brackets 475, 471 from inadvertent disengagement. As shown, the second groove 467 of the shaft 463 is significantly wider and shallower than the first groove 464. The second groove 467 may not exist at all, so that the second pin 472 of the second securing bracket 471 pushes against the shaft 463 without engaging a groove.

As shown in FIG. 11, the first securing bracket 475 and the second securing bracket 471 may have different lengths. When properly engaging their respective grooves 464, 467 the first pin 476 and the second pin 472 are positioned at different radial distances from a central axis of the shaft 463. Yet, the bases 473 of the first securing bracket 475 and the second securing bracket 471 are aligned, providing visual confirmation that the shaft 463 is securely retained within the instrument adaptor 450.

An exemplary first configuration of the lower instrument adaptor 410 is shown in FIG. 3. Notably, the lower instrument adaptor 410 provides a lower receiving opening 420 for attaching a lower guide element 460 for the guided instrument 400 and an adjacent attachment mechanism 421 for attaching an imaging device such as an ultrasound transducer 405. The ultrasound transducer 405 is held in a retaining bracket 430 with a clamping element 434 which is secured to the retaining bracket 430 with two fasteners 432. As shown, the retaining bracket 430 may be pivotally mounted to the lower instrument adaptor 410 to allow adjustment of the roll angle of the ultrasound transducer 405 relative to the x/y plane of the lower body 210. For that purpose, opposing surfaces of the lower instrument adaptor 410 and the retaining bracket 430 may be formed as releasably connected crown gears. For example, the lower instrument adaptor 410 and the retaining bracket 430 may be connected by a spring device which pulls the lower instrument adaptor 410 and the retaining bracket 430 towards each other. The biasing force of the spring device causes the opposing crown gears to engage, which prevents rotation of the lower instrument adaptor 410 relative to the retaining bracket 430.

To adjust the roll angle of the retaining bracket 430, a user may pull the retaining bracket 430 against the biasing force of the spring device far enough to disengage the opposing crown gears. The user may then rotate the retaining bracket 430 into the desirable roll angle position and allow the crown gear of the retaining bracket to reengage the opposing crown gear of the lower instrument adaptor to form a secure connection.

An alternative exemplary configuration of a lower instrument adaptor 410 with an integral retaining section 435 for an ultrasound transducer 405 is shown in FIG. 4. The lower instrument adaptor 410 has a plug section 411 which is received within the adaptor socket of the lower actuator arm 212. In the configuration as shown, roll and pitch of the integral retaining section 435 are not adjustable.

Yet another exemplary configuration of a lower instrument adaptor 410 is shown in FIG. 5. In this configuration, the ultrasound transducer 405 is rotated by 90 degrees relative to the configurations illustrated in FIG. 3. In the orientation shown in FIG. 5, a relatively wider horizontal field of view of the ultrasound transducer 405 extends parallel to the y-axis of the lower body 210 of the robot 200 and a relatively narrower vertical field of view of the ultrasound transducer 405 extends parallel to the x-axis of the lower body 210 of the medical robot 200. The roll angle of the retaining bracket 431 relative to the lower instrument adaptor 410 can be adjusted, using two opposing crown gears as described. A scale 433 may be provided next to the crown gears to visualize the selected roll angle.

As shown in FIG. 2, the field of view 402 of the ultrasound transducer 405 is preferably adjusted such that the path of the guided instrument 400 and the target 101 are within view of the ultrasound transducer 405. Preferably, the position and the roll angle of the ultrasound transducer 405 are selected such that a central axis 403 of the field of view 402 of the ultrasound transducer 405 and a path of the guided instrument 400 intersect at an intersection angle of at least 5° and even more preferably of at least 15°. Alternatively, the roll angle of the guided instrument 400 and the roll angle of the ultrasound transducer 405 may be selected to form an intersection angle of at least than 5° and even more preferably of at least 15°. The desirable intersection angle can be obtained by suitable design of the lower instrument adaptor 410 in combination with the retaining bracket 431, by adjusting the retaining bracket 431 roll angle, and by adjusting the guided instrument roll angle. Having a large intersection angle between the guided instrument 400 and the field of view of the ultrasound transducer 405 ensures that the guided instrument 400 moves visually within an ultrasound image observed by a surgeon, providing the surgeon visual depth information of the guided instrument 400.

The ultrasound transducer 405 may a diagnostic (imaging) device or a therapeutic device. A therapeutic ultrasound transducer 405 may e.g. be used for physical therapy in conditions such as tendinitis or bursitis. High pressureamplitude ultrasound may be used for mechanically resolving kidney stones and "lithotripsy". Therapeutic uses of ultrasound continue to expand and include uterine fibroid ablation, cataract removal (phacoemulsification), surgical tissue cutting and hemostasis, transdermal drug delivery, and bone fracture healing, among others. The medial robot 200 can be used in combination with a therapeutic ultrasound transducer 405 to precisely direct the ultrasonic waves in a patient and to automatically sweep the ultrasound transducer 405 along a predetermined path. For example, the medical robot 200 may be configured to move the ultrasound transducer 405 along a serpentine path within an area of interest.

As shown, an ultrasonic transducer may be held within a retaining section of a lower instrument adaptor to provide automated positioning of the ultrasonic transducer within an x/y plane. The ultrasonic transducer in the shown configuration is not connected to the upper instrument adaptor. Alternatively, as shown e.g. in FIG. 12, an ultrasonic transducer may be connected to both the lower instrument adaptor and the upper instrument adaptor, allowing both automated linear positioning of the ultrasonic transducer and automated pitch and roll adjustment. The ultrasonic transducer may have an elongated generally cylindrical body, such as for example the L44LA1 or UST-52109 ultrasonic transducers sold by Hitachi Medical Systems.

Figure 12:
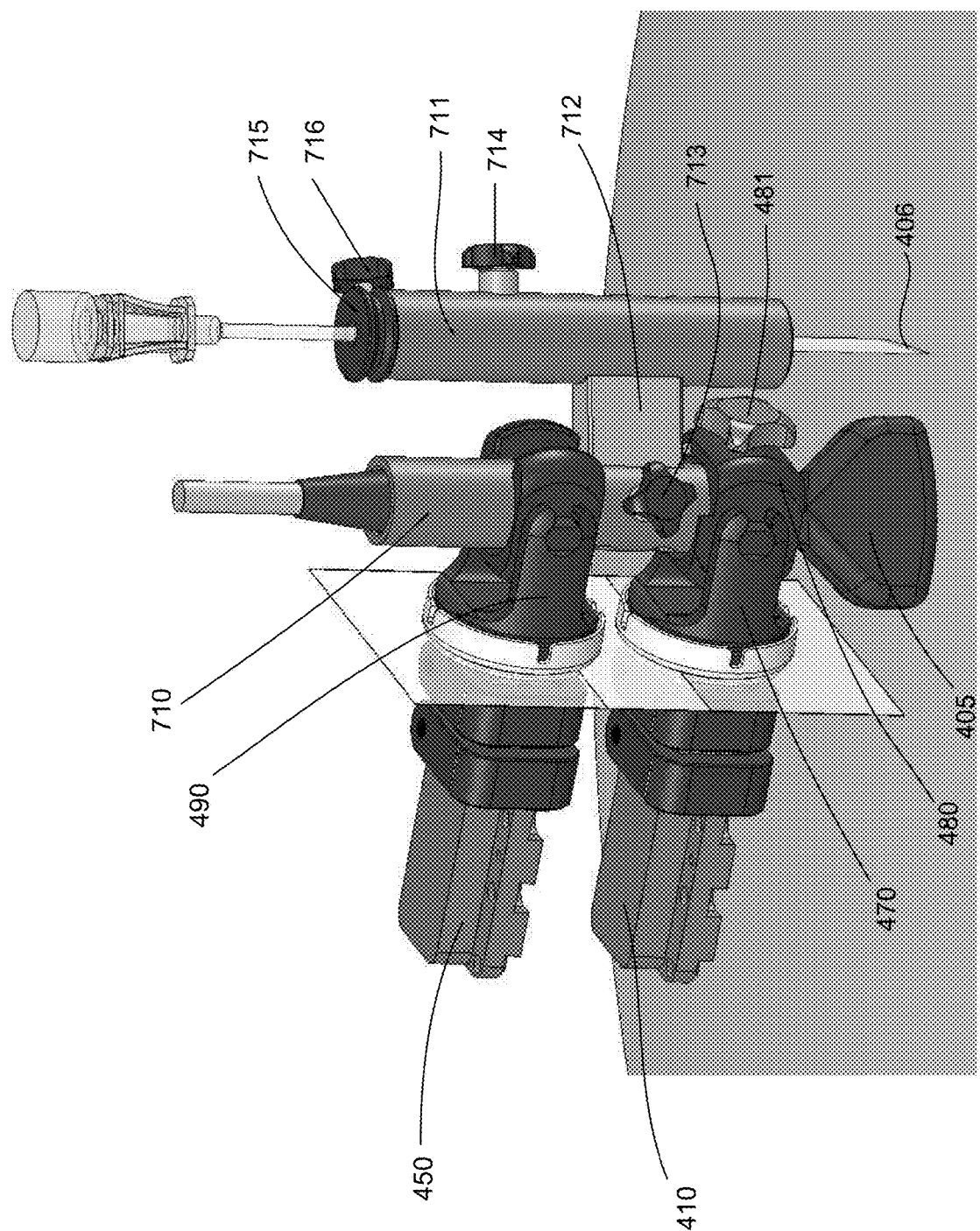
FIG. 12 shows two parallel guide tubes attached to one another.

For clarity of illustration the medical robot is not shown in FIG. 12. Rather, the lower instrument adaptor 410 and the upper instrument adaptor 450 that mount to an upper and lower arm of the medical robot are shown. Attached to the lower instrument adaptor 410 is a lower gimbal mount 470. Attached to the upper instrument adaptor 450 is an upper gimbal mount 490. A first guide tube 710 is clamped into an inner gimbal element 480 of the lower gimbal mount 470 with a clamping screw 481. A second guide tube 711 is arranged parallel to the first guide tube 710. The first guide tube 710 and the second guide tube 711 are connected to each other by a spacer element 712.

A first medical instrument, here shown in form of an ultrasonic transducer 405 is held within the first guide tube 710 by a clamping mechanism in form of a clamping screw 713. A second medical instrument, here shown in form of a needle 406, is held within a needle adaptor 715 in the second guide tube 711. The needle adaptor 715 is clamped in the second guide tube by a second clamping mechanism in form of a second clamping screw 714. The needle can slide longitudinally within the needle adaptor 715 while a third clamping screw 716 has not been tightened. Alternatively, by tightening the third clamping screw 716, the needle 406 can be clamped into the needle adaptor 715.

Figure 13:
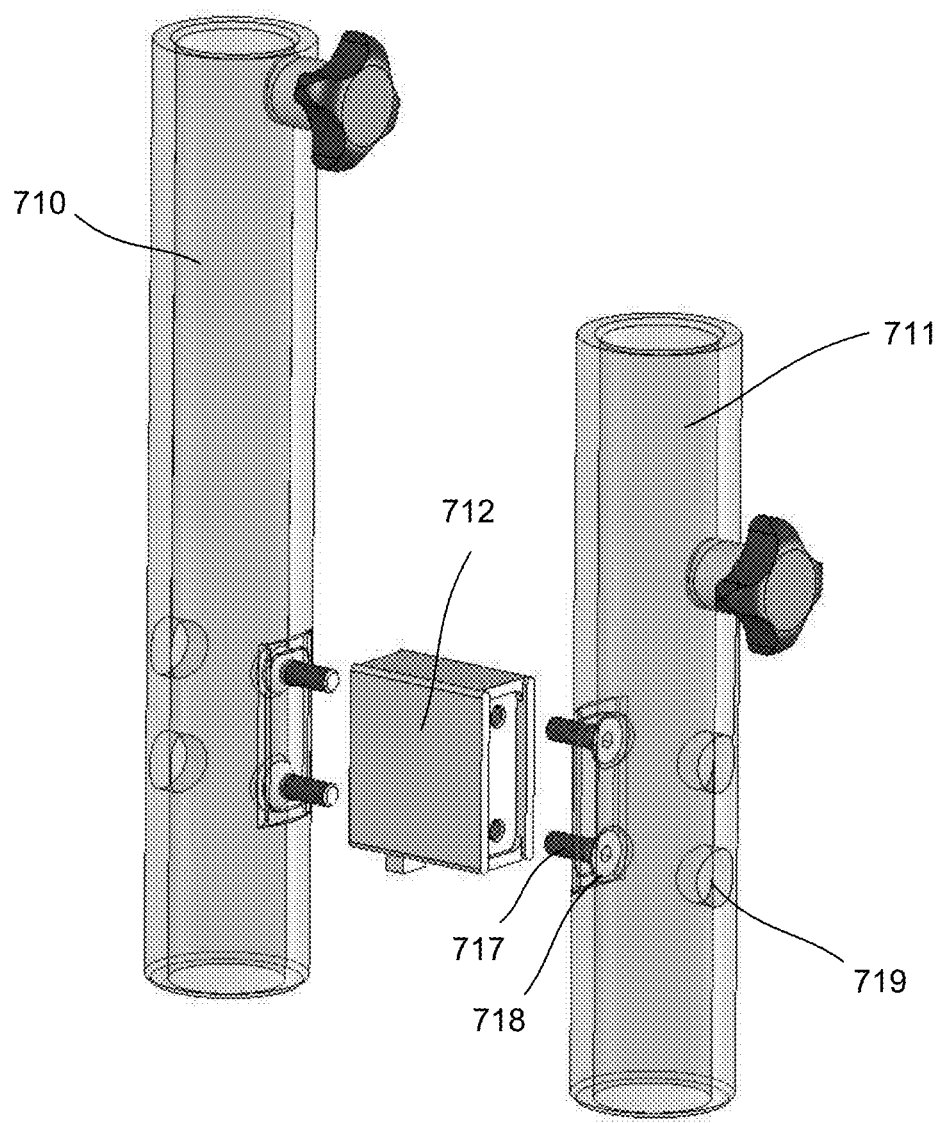
FIG. 13 is an exploded view of two connected guide tubes.

As shown in even greater detail in FIG. 13, the first guide tube and the second guide tube are firmly connected to each other by the spacer element 712. More specifically, the substantially cylindrical guide tubes 710, 711 may have holes 718 through which sunk head screws 717 attach the guide tubes 710, 711 to the spacer element 712. For that purpose, the spacer element 712 may have threaded openings for accepting the screws 717. Arranged within each of the guide tubes opposite the holes 718 which receive the screws 717 may be access openings 719 which provide access to the screws 717 during assembly. As shown, the first guide tube 710 and the second guide tube 711 are firmly attached to one another at a predetermined distance, the longitudinal axes of the guide tubes being arranged in parallel. When in use, pitch and roll of the first guide tube 710 and the second guide tube 711 are thus identical. The position of the second guide tube 711 can however be adjusted by rotating the first guide tube within the lower and upper gimbal mounts 470, 490 before securing the clamping screw 481 in the lower gimbal mount.

Figure 14:
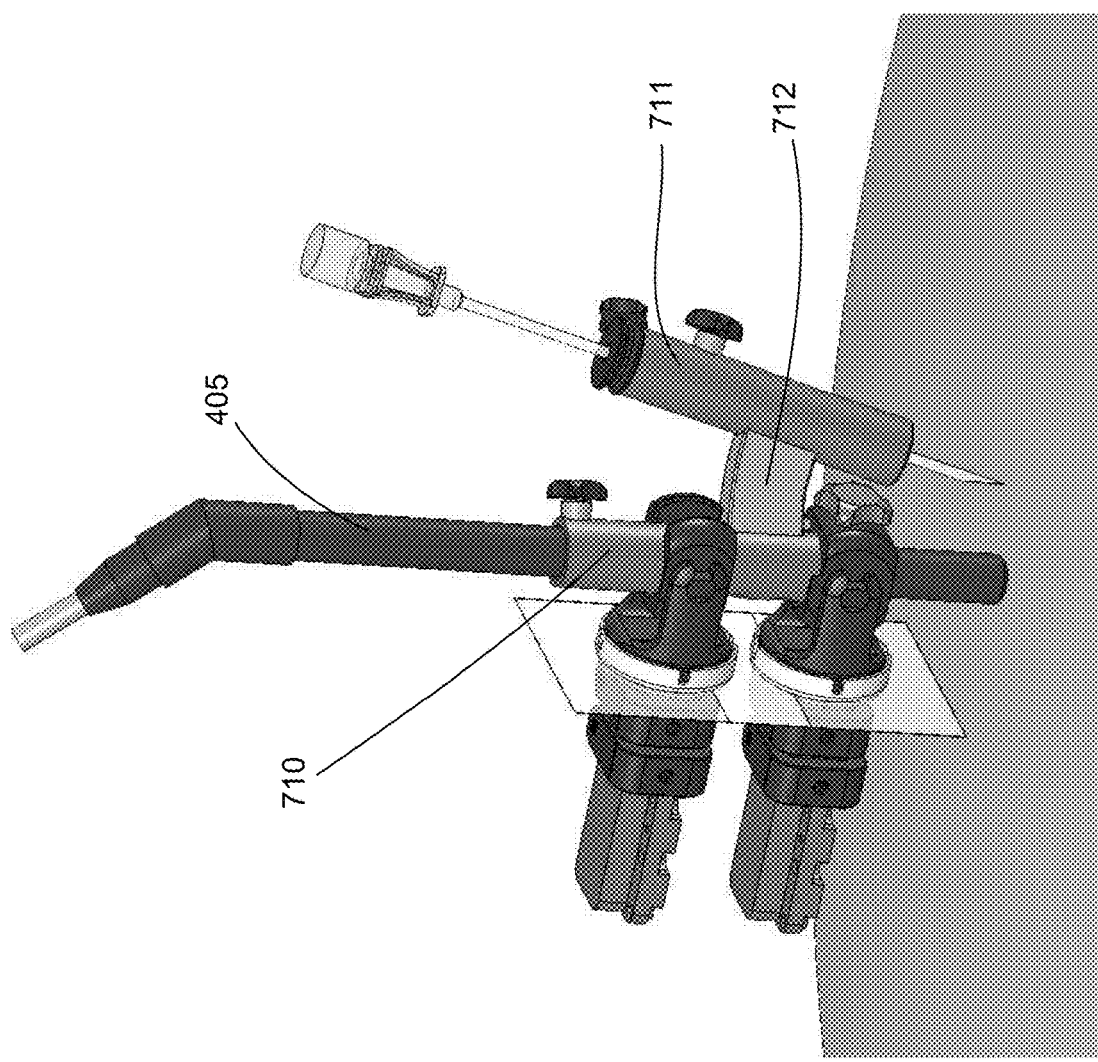
FIG. 14 shows two guide tubes with intersecting longitudinal axes attached to one another.

As shown in FIG. 14, the first guide tube 710 and the second guide tube 711 need not be arranged in parallel but may be pointing towards each other by providing a differently shaped spacer element 712. Depending on the shape of the spacer element 712 the longitudinal axis of the first guide tube 710 and the longitudinal axis of the second guide tube 711 may be arranged at a relative pitch and roll angle, and are preferably arranged such that their longitudinal axes intersect at a point below a lower end of the first guide tube 710 and a lower end of the second guide tube 711.

Figure 15:
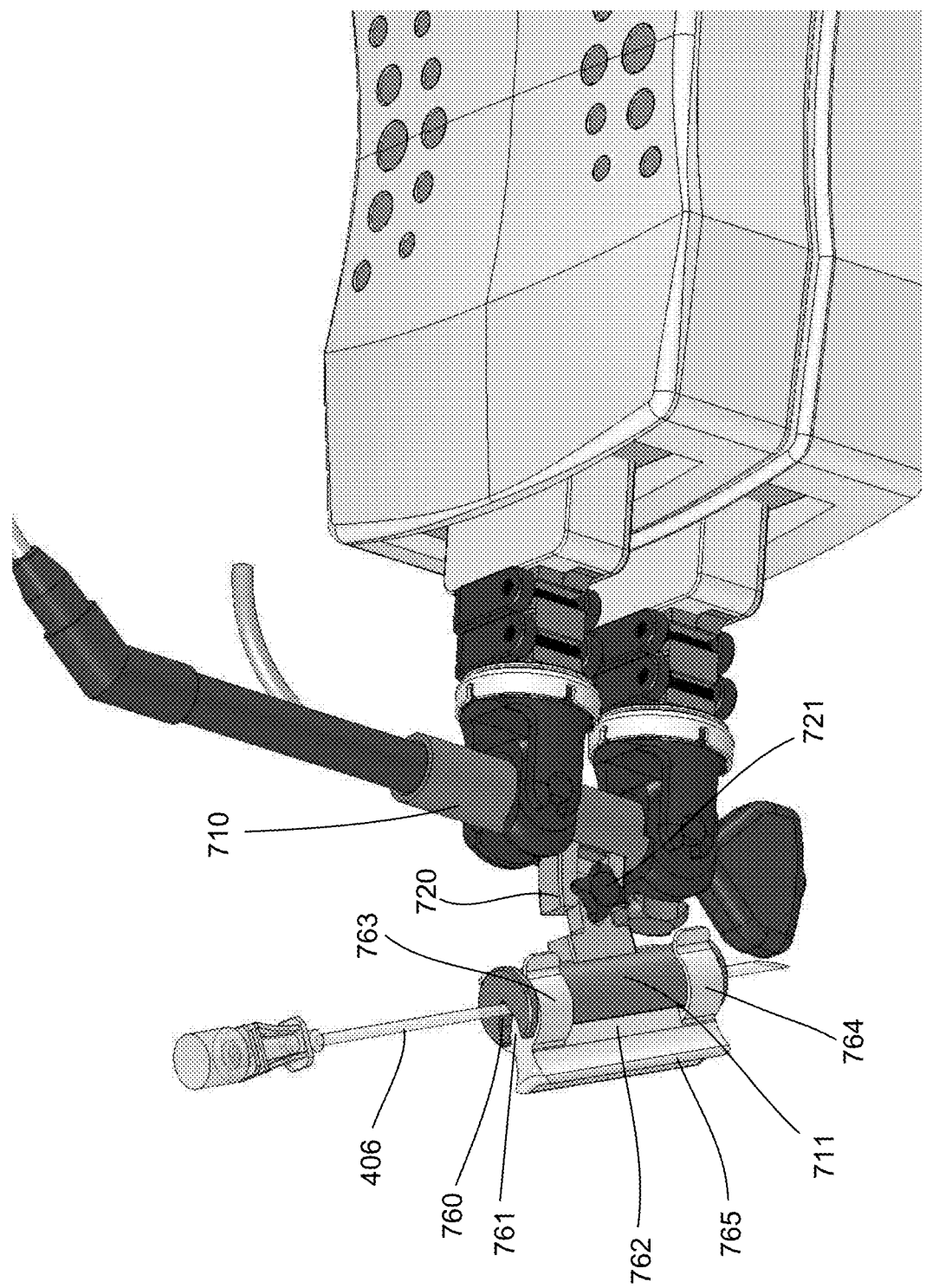
FIG. 15 shows two guide tubes with adjustable angular arrangement and a quick release clip.

In some applications, it can be desirable to adjust the relative angle of the first guide tube 710 and the second guide tube 711. An exemplary embodiment that provides the desired adjustability in form of angular adjustment mechanism 720 is shown in FIG. 15. The angular adjustment mechanism 720 allows the angle of the longitudinal axes of the first guide tube 710 to be variably adjusted by releasing a clamping screw 721, adjusting the orientation of the second guide tube 711, and re-tightening the clamping screw 721.

The guided instrument 400 as shown in FIG. 2 is slidably held by a lower guide member 461 and an upper guide member 462. The lower guide member 461 and the upper guide member 462 may be identical. Each guide member 461, 462 is rotatably attached to a receiving opening 420 of the respective instrument adaptor 410, 450. That is, each guide member 461, 462 can rotate about its longitudinal axis within the receiving opening 420. As shown, the guide member's longitudinal axis is positioned parallel with the x-axis of the robot, thus allowing a roll movement of the guide member 461, 462.

The guided instrument 400 is held within the guide member by a spring-loaded retaining clip 466. The spring-loaded retaining clip 466 allows the guided instrument to slide through the clip. The spring-loaded retaining clip 466 also allows the guided instrument to pivot (change pitch) about a clip pivot axis, which is perpendicular to the longitudinal axis of the respective guide member 461, 462. Each guide member 461, 462 secures a lateral and longitudinal position of the guided instrument within the x/y plane, but allows the guided instrument 400 to pitch and roll freely, effectively forming a two-axis gimbal. Acting together, the position of the lower guide member 461 and the upper guide member 462 thus define the longitudinal (x-axis) position, the lateral (y-axis) position, the pitch, and the roll of the guided instrument 400 and thus its path when manually pushed by a surgeon.

An alternative mechanism to slidably attach a guided instrument to the medical robot is shown in FIG. 15. Here, the guided instrument in form of a needle 406 is inserted into a V-shaped channel 760 formed within a guide tube 711. The needle 406 is slidably held in place by a quick release clip 762. The quick release clip 762 has a V-shaped protruding portion 761 which engages the V-shaped channel 760 and pushes the needle 406 into the channel 760. The needle 406 rests within the guide tube 711 along the entire longitudinal extension of the V-shaped channel 760 and is pushed into the channel 760 by a front edge of the V-shaped protruding portion 761 of quick release clip 762. The quick release clip 762 is attached to the guide tube 711 with two spring clips 763, 764. The spring clips may be formed integrally as part of the quick release clip 762, e.g. be part of a molded plastic part. A grip 765 may be formed opposite the V-shaped protruding portion 761 along the body of the quick release clip 762 to allow easy attachment to and removal from the guide tube 711.

It may be useful to push a medical instrument, in particular an ultrasonic transducer 405, onto the skin of a patient. This can e.g. be accomplished by securing the medical robot 200 in a fixed orientation relative to the patient 100, pushing the ultrasonic transducer 405 onto the patient 100, and clamping the body of the ultrasonic transducer into a guide tube 710 by fastening a clamping screw 713. This method does not provide any further movement of the ultrasonic transducer 405 within the guide tube 710 after the clamping screw 713 has been fastened.

Figure 16:
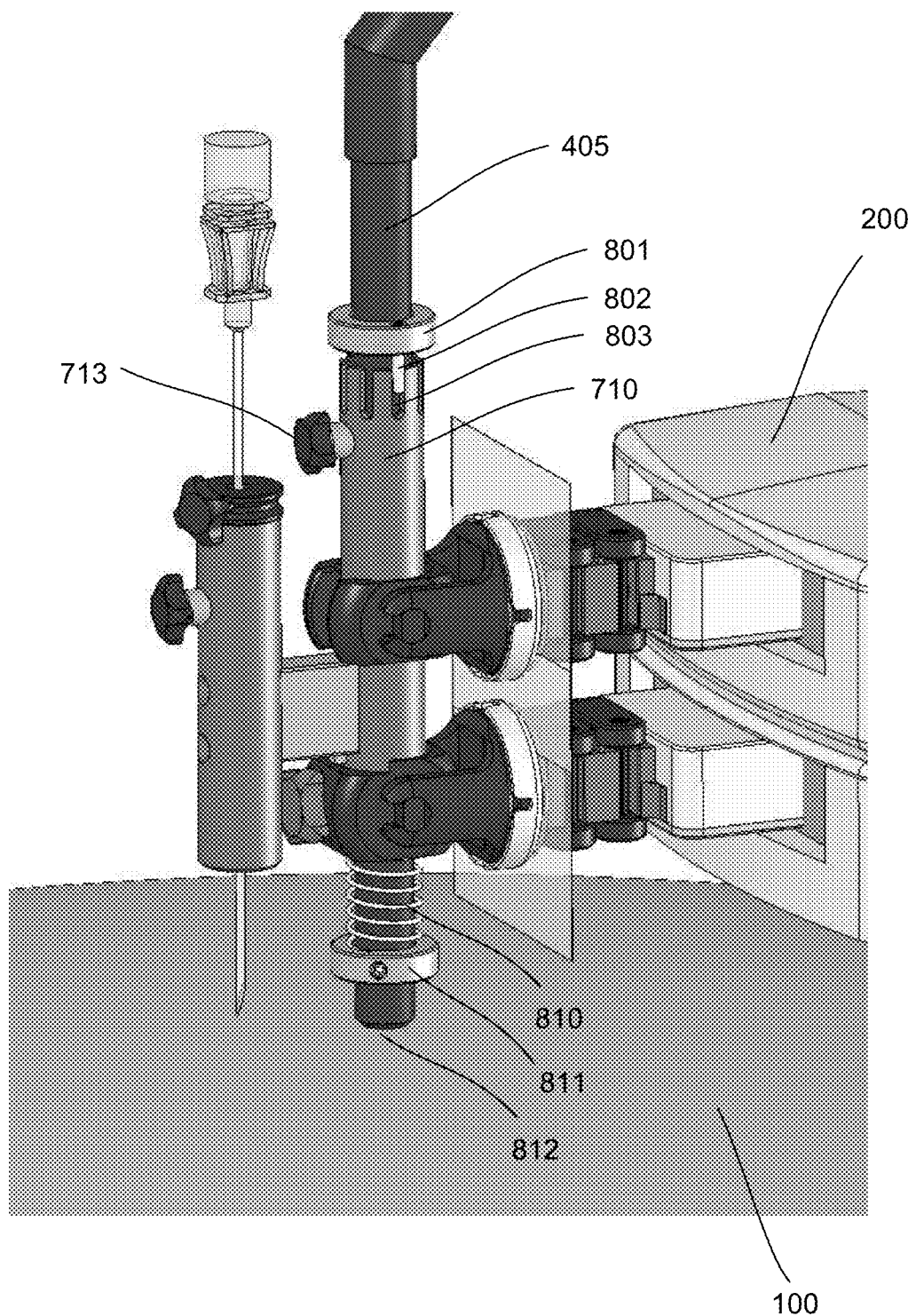
FIG. 16 shows an ultrasonic transducer instrument spring loaded within a guide tube.

An alternative method of pushing an ultrasonic transducer 405 onto a patient 100 is shown in FIG. 16. Here, the ultrasonic transducer 405 is slidably arranged within the guide tube 710. A spring 810 is arranged around the ultrasonic transducer 405 between a lower inner gimbal element and a collar 811 which is attached to the ultrasonic transducer 405 with a set screw. This design allows the ultrasonic transducer to move upwards against the force of the spring 810. Respectively, the spring 810 pushes the ultrasonic transducer 405 onto the patient 100 against the lower gimbal so that a lower end 812 of the ultrasonic transducer 405 maintains good contact with the patient 100 at all times.

The design as shown in FIG. 16 allows the ultrasonic transducer 405 to slide within the guide tube 710. To prevent an undesired rotation of the ultrasonic transducer 405 around its longitudinal axis within the guide tube 710 a rotational locking mechanism may be provided. The locking mechanism includes a rotational adjustment ring 801 with a least one protrusion 802 which engages one of a plurality of recesses 803 at the upper end of the guide tube 710. The adjustment ring 801 is secured onto the ultrasonic transducer 405. The recesses 803 extend axially along the guide tube 710 and allow the protrusion 802 and with it the ultrasonic transducer 405 to slide up and down, but prevent rotation of the ultrasonic transducer 405.

It may be desirable to coordinate the position of the collar 811 and the spring 810 at the lower end of the ultrasonic transducer 405 with the lengths of the recesses 803 and the position of the adjustment ring 801. Then, it may be possible to push the ultrasonic transducer all the way up, rotate it manually, and allow the protrusion to reengage a different recess 803. Thereby, it is possible to adjust the rotational position of the ultrasonic transducer 405, which may be desirable especially in combination with ultrasonic transducers that have an asymmetrical field of view. For example, it may be desirable to orient a horizontal field of view of the transducer 405 in a beneficial orientation relative to the patient 100, and possibly change the orientation during a medical procedure, e.g. by rotating the ultrasonic transducer by 90 degrees.

As shown in FIG. 16, the ultrasonic transducer 405 is pushed onto the skin of a patient. However, in other applications the ultrasonic transducer 405 may be used in a transluminal or intraluminal application in which the ultrasonic transducer 405 is inserted into the patient. The ultrasonic transducer may e.g. be used percutaneously or intravascularly.

Figure 21:
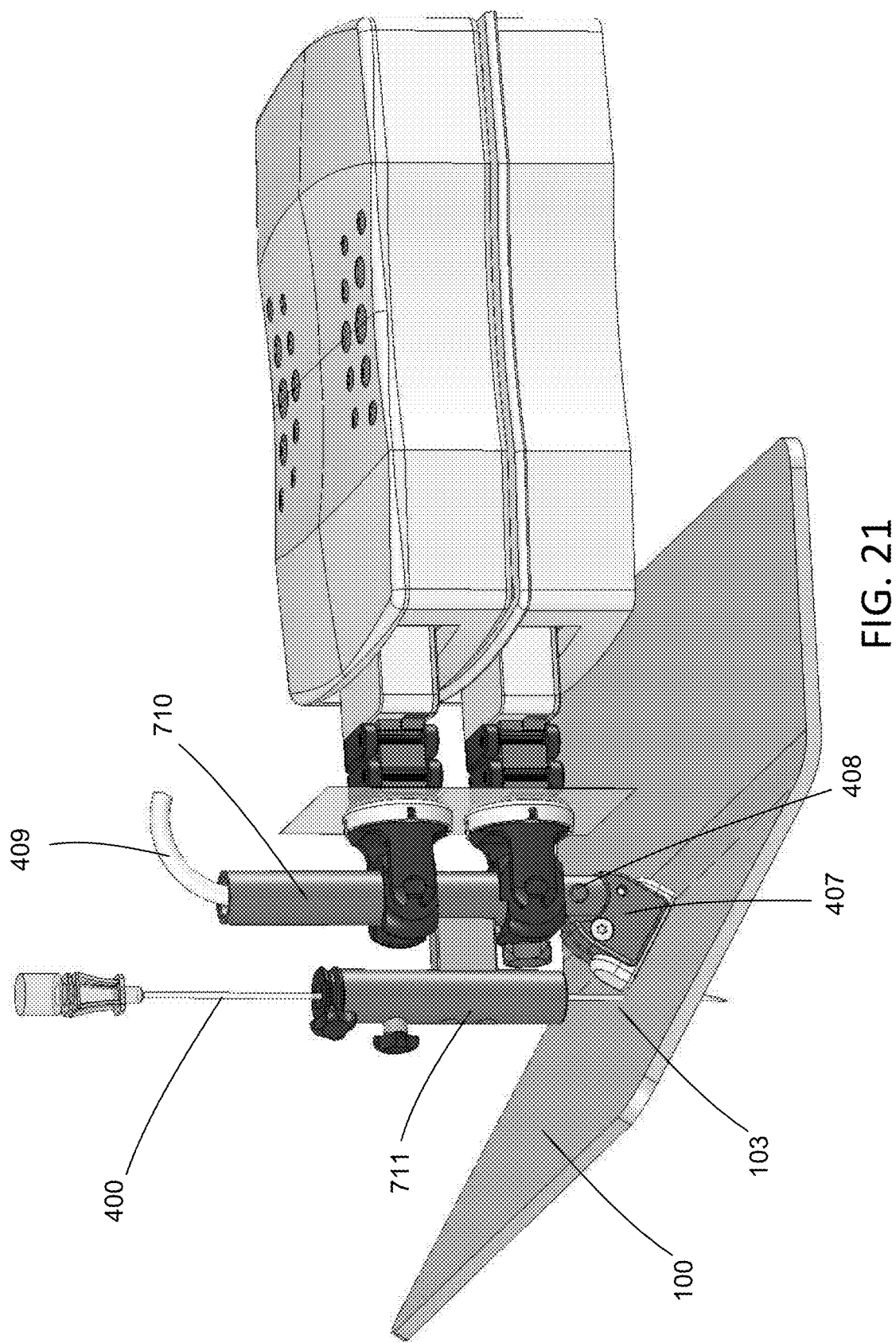
FIG. 21 shows a medical robot in use at a tilted operating surface.

Referring now to FIG. 21, an application is shown in which the guided instrument 400 is injected through the skin of a patient 100 at an incision 103. The guided instrument 400 is arranged at an angle of approximately 45 degrees relative to the body of the patient 100 at the incision 103. As shown, a second instrument in form of an ultrasonic transducer 407 is hingedly connected to a lower end of a first guide tube 710. The first guide tube 710 is arranged parallel to a second guide tube 711 which guides the guided instrument 400. The ultrasonic transducer 407, as shown, can pivot freely about a pivot axis 408 to align tangentially with the body of the patient 100 proximal to the incision 103. Alternatively, a locking mechanism may be provided to hold the ultrasonic transducer 407 in an adjustably releasable position. In yet another configuration the pivot axis 408 may be replaced with an actuator to actively control the pitch and/or roll of the ultrasonic transducer 407 relative to the first guide tube 710. The ultrasonic transducer 407 may be electrically connected to a processing and display device (not shown) with a wire 409 which extends through the first guide tube 710 and exits the first guide tube 710 at an upper end thereof.

Figure 17:
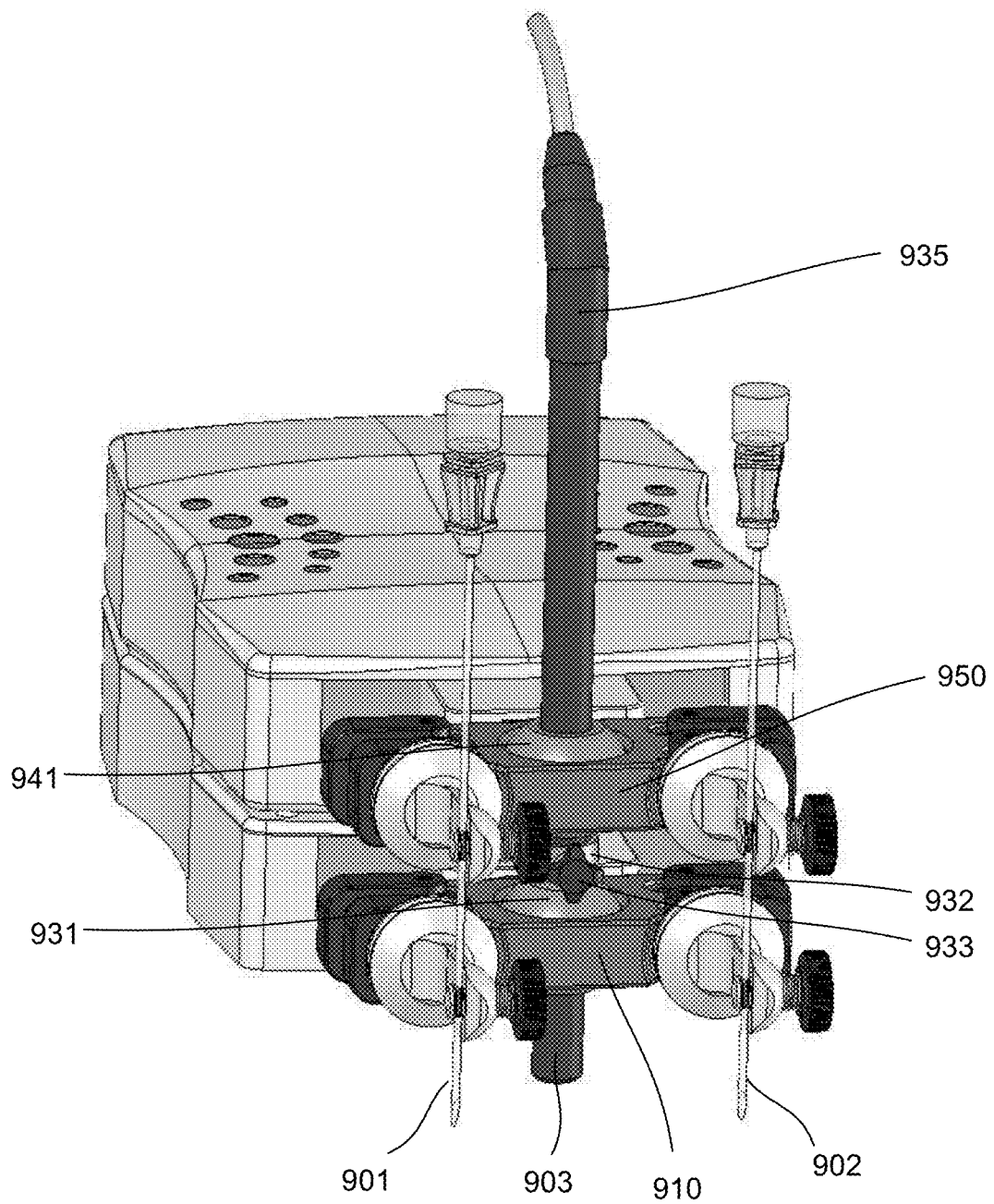
FIG. 17 shows an arrangement of three instruments, each having separate upper and lower gimbal attachments to upper and lower instrument adaptors.
Figure 18:
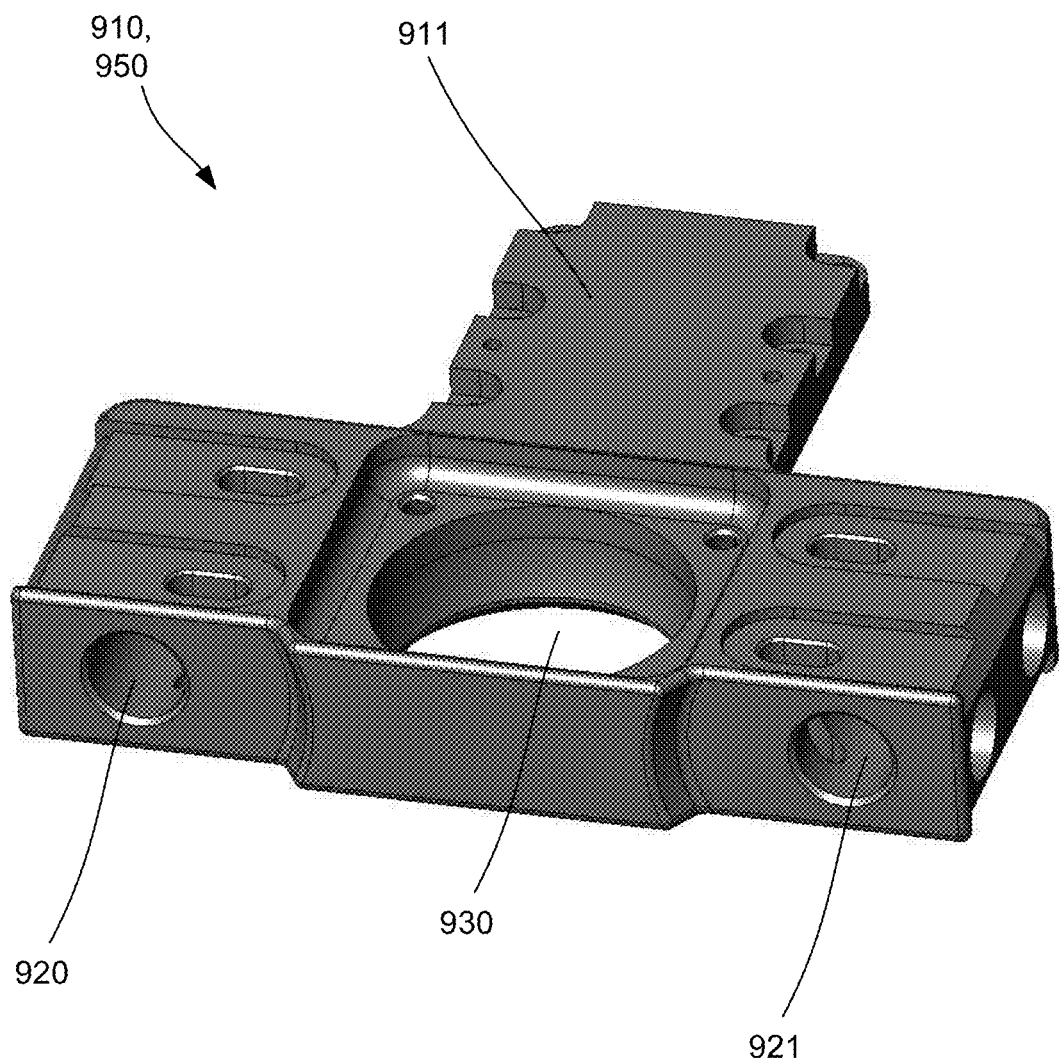
FIG. 18 is a detailed view of the instrument adaptor body as in FIG. 17.

In some applications it is beneficial to guide more than two medical instruments. For example, the medical robot may be used to perform irreversible electroporation (IRE). IRE is a soft tissue ablation technique using ultra short but strong electrical fields. A number of electrodes, in the form of long needles, are placed around the target volume. The point of penetration for the electrodes is chosen according to anatomical conditions. Imaging is essential to the placement and can be achieved by ultrasound, magnetic resonance imaging or tomography. The needles are then connected to an IRE-generator, which proceeds to sequentially build up a potential difference between two electrodes. An exemplary embodiment of a medical robot with a lower instrument adaptor 910 and an upper instrument adaptor 950 which are adapted to guide three medical instruments is shown in FIG. 17. A detailed view of the lower instrument adaptor 910 is shown in FIG. 18.

The lower instrument adaptor 910 and the upper instrument adaptor 950 may be identical. The instrument adaptor 910, 950 has a rear-facing plug section 911 which is received within the adaptor socket of the robot's lower/upper actuator arm. The plug-section 911 of the instrument adaptor may be standardized to allow various different instrument adaptors to be used with the same medical robot. The instrument adaptor 910, 950 as shown has a generally T-shaped body. A first cylindrical receiving opening 920 for a first instrument guide member is provided on one side, a second cylindrical receiving opening 920 for a second instrument guide member is provided on an opposite side of the T-shaped body. The cylindrical receiving openings 920, 921 face forward, their axes being parallel to each other and to a longitudinal extension of the rear-facing plug section 911. In between the receiving openings 920, 921 a cavity 930 for a gimbal ball 931, 941 is formed. A medical imaging device, e.g. an ultrasonic transducer 935 with a generally cylindrical body may be inserted through openings in the lower gimbal ball 931 and the upper gimbal ball 941. The lower gimbal ball 931 may have a clamping collar 932 extending upwardly from its central opening. The ultrasonic transducer 935 may be clamped to the lower gimbal ball 931 with a clamping mechanism in form of a screw 933 which reaches through a threaded opening in the clamping collar 932. The ultrasonic transducer may slide freely within the opening in the upper gimbal ball 941.

To variably position several instruments more than one medical robot may be used. For example, two or more compact medical robots may be arranged in a fixed position relative to a patient to guide one or more instruments each. Preferably, the two or more compact medical robots are operatively connected to a common control system by which a surgeon can manipulate the two or more robots simultaneously.

Linear and Rotational Actuator

While the robot 200 as shown e.g. in FIG. 2 precisely defines a path for a guided instrument 400, it relies on a surgeon to manually push the guided instrument 400 along that path. An improved robot 201 with additional actuators in shown in FIG. 6. The improved robot 201 is based on the robot 200 as described. It includes an additional linear actuator 600 which is used to automatically move an automated instrument 401 along a path. The path is defined by the position of two x/y actuators as before. The improved robot 201 further includes a rotational actuator 700 which controls rotation of the automated instrument 401 around its longitudinal axis. The improved robot 201 can thus be used in combination with instruments 401 such as e.g. an endoscope having a defined field of view 402 in which rotational position of the automated instrument 401 is important. The improved robot 201 with the additional linear actuator 600 but without the rotational actuator 700 may be referred to as a 5-axis robot. The improved robot 201 with both the additional linear actuator 600 and the rotational actuator 700 may be referred to as a 6-axis robot.

Figure 7:
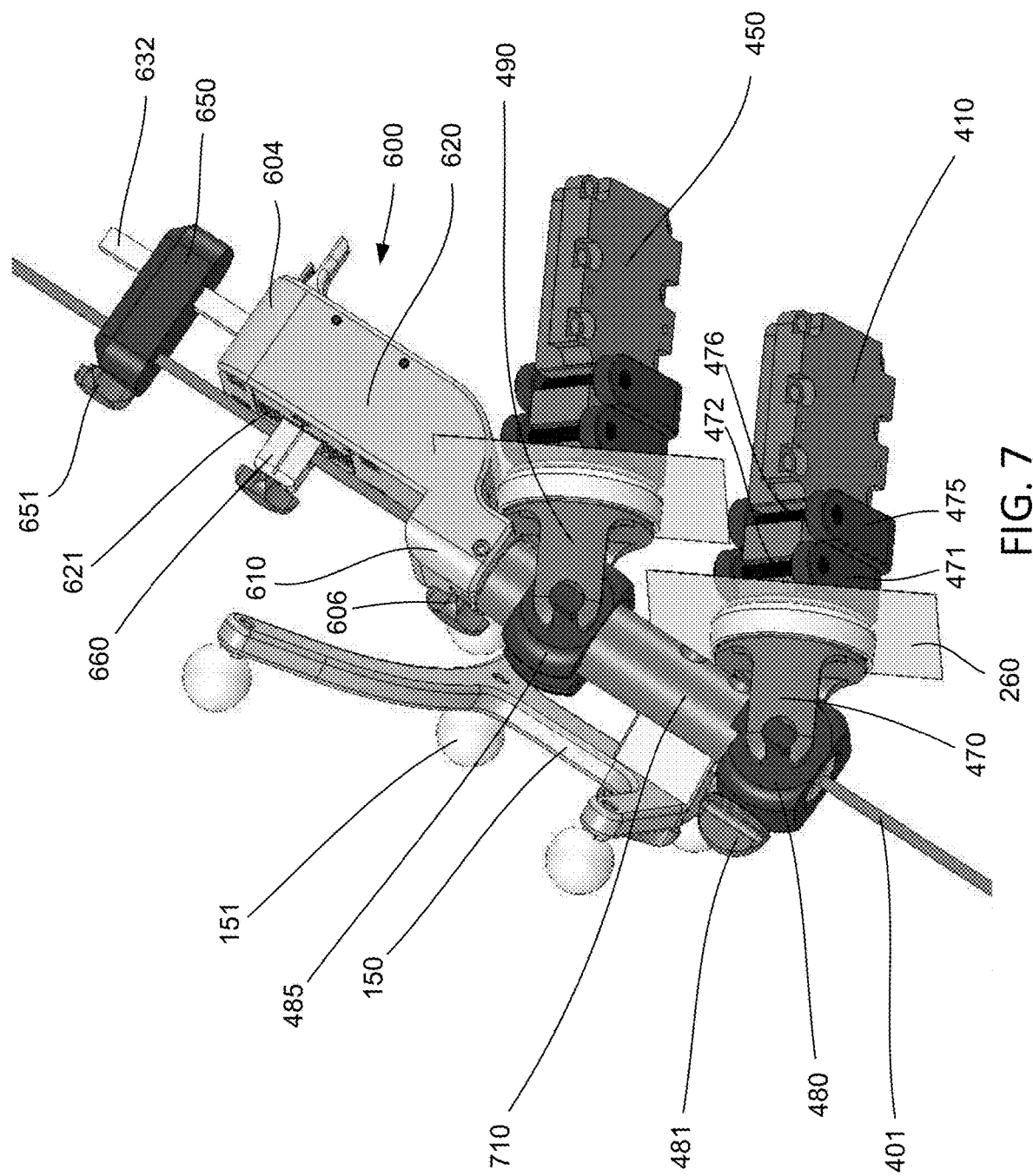
FIG. 7 is a detailed view of parts of a medical robot with a linear instrument actuator.

FIG. 7 shows several aspects of the improved robot 201 in more detail. Shown are a lower instrument adaptor 410 and an upper instrument adaptor 450. The instrument adaptors 410, 450 can be inserted into the lower and upper actuator arms 212, 252 of the lower and upper body of the robot (not shown in FIG. 7). A lower gimbal mount 470 is pivotally connected to the lower instrument adaptor 410 and retained by two securing brackets 471, 475. The securing brackets include retaining pins 472, 476 which engage corresponding grooves within an attachment shaft of the gimbal mount 470, allowing rotation of the gimbal mount 470 around the attachment shaft within the receiving opening of the respective instrument adaptor.

Each gimbal mount includes an inner gimbal element 480, 485 with a central opening. A guide tube 710 extends through the central opening of the lower inner gimbal element 480 and the upper inner gimbal element 485. The guide tube 710 is secured at a lower end within the lower inner gimbal element 480 by a clamping screw 481. The guide tube 710 extends upwardly through and can slide and rotate freely within the upper inner gimbal element 485.

The linear instrument actuator 600 is attached to an upper end of the guide tube 710. More specifically, a receiving opening 602 is formed within a lower end of a housing 604 of the linear instrument actuator 600. A clamping screw 606 is provided to securely clamp a lower body portion 610 of the linear instrument actuator 600 to the guide tube 710.

Figure 9:
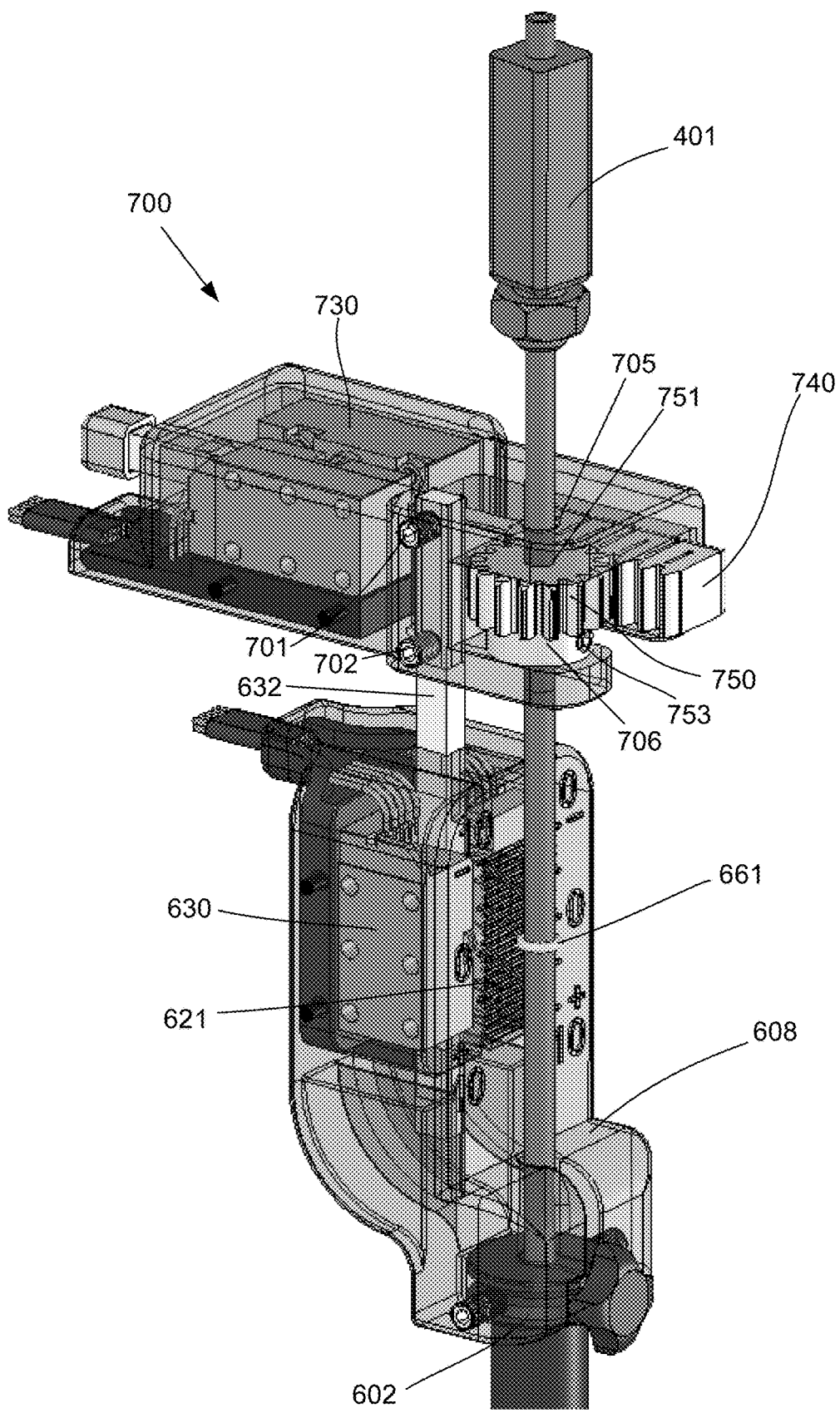
FIG. 9 shows a rotational instrument actuator and a linear instrument actuator with transparent housings.

Located directly above the receiving opening 602 within the lower body portion 610 is an instrument opening 608 through which an instrument 401 can be inserted into the hollow guide tube 710. As shown in FIG. 9, the instrument opening 608 may be formed as a slot that extends along a major part of the lower body portion 610. A main body portion 620 of the linear instrument actuator 600 is offset from the lower body portion 610 so that the instrument 401 which reaches through the lower body portion 610 extends outside of the main body portion 620 of the linear actuator.

A linear motor 630 is arranged within the main body portion 620 of the linear actuator 600 and adapted to move an actuating rod 632. The actuating rod 632 extends upwardly through an upper rod opening and may extend downwardly through a lower rod opening through the main body portion 620 of the linear instrument actuator 600. The actuating rod 632 has a longitudinal axis which is radially offset from and parallel to the guide tube 710.

An instrument clamp 650 is firmly attached at an upper end section of the actuating rod 632. The instrument clamp 650 has a clamp screw 651 for releasably clamping the actuated instrument 401 to the actuating rod 632. When in use, the actuated instrument 401 is firmly connected to the actuating rod 632 by the instrument clamp 650. The actuating rod 632 is propelled by the linear motor 630 and moves relative to the body of the actuator 600. Since the body of the actuator 600 is clamped to the guide tube 710, the actuated instrument 401 moves in parallel with the actuating rod 632 upwardly and downwardly through the guide tube 710.

Figure 8:
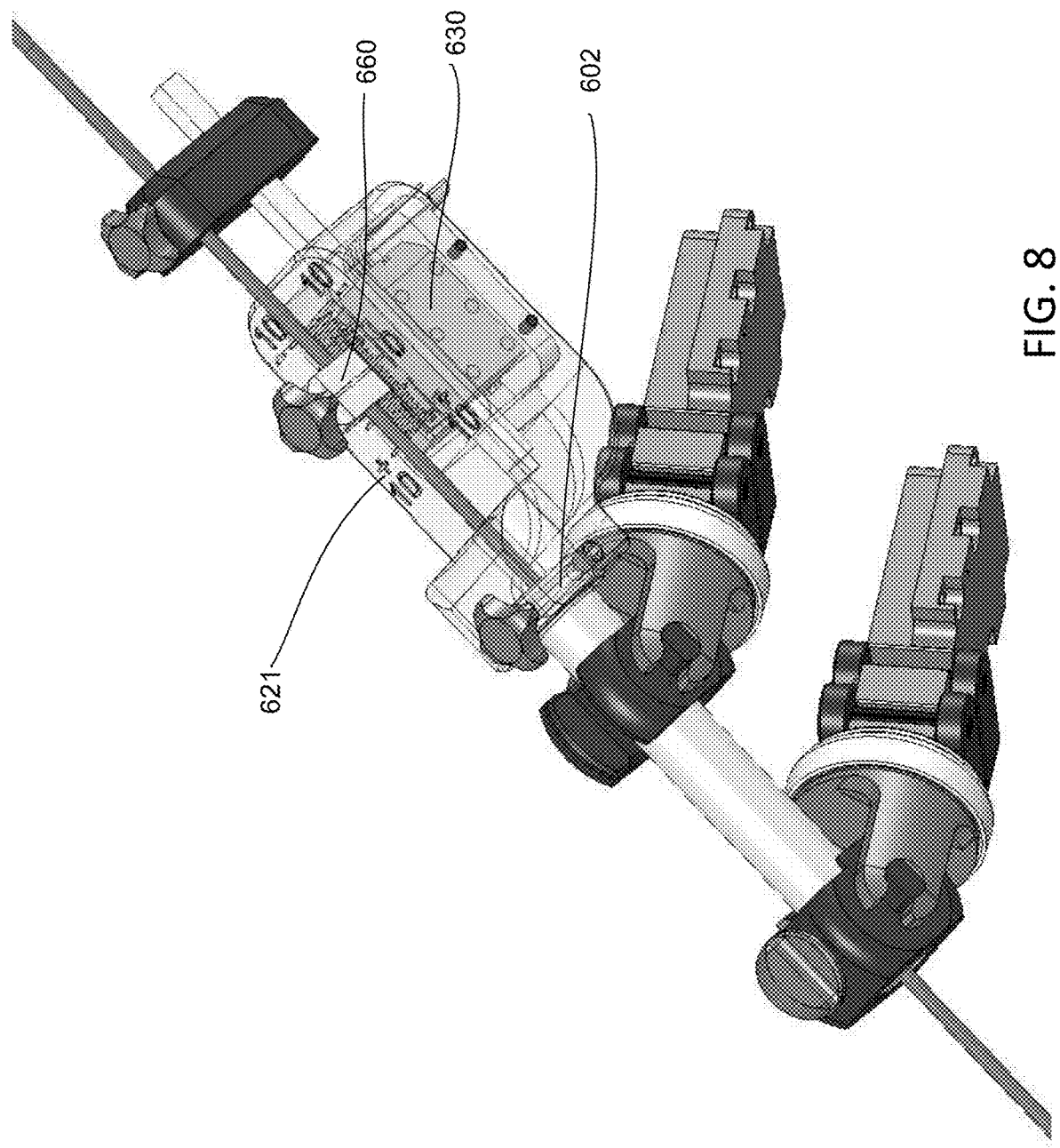
FIG. 8 is a detailed view showing the linear instrument actuator of FIG. 7 with a transparent housing.

FIG. 8 shows the arrangement as in FIG. 7 with a semi-transparent housing of the actuator 600. A scale 621 may be provided on a face of the main body portion 620 of the linear instrument actuator 600 proximal to the actuated instrument 401. The scale may e.g. be printed onto or molded into a wall of the main body portion 620. A sliding marker 660 may be clamped onto the actuated instrument 401 and may be used in combination with the scale 621 to show the longitudinal travel of the actuated instrument 401.

While various different mechanisms may be used as a linear motor 630, a particularly beneficial implementation is based on using a piezo-electrical linear actuator, e.g. a Piezo LEGS® Linear Twin 20N made by PiezoMotor Uppsala AB. Advantageously, piezo-electric actuators are available without ferromagnetic components, allowing their use within an MRI device. Also, piezo-electric actuators provide highly precise positioning, allowing to control the linear movement of the actuating rod 632 and thereby the linear movement of the actuated instrument 401 in steps of less than 1 nm, technically providing actuating precision that would allow targeting a specific cell within a patient's body.

It is readily apparent, that the use of a fixed instrument clamp 650 does not provide rotation of the automated instrument 401 around its longitudinal axis. That is sufficient for many applications which do not require any particular rotational orientation of the automated instrument 401.

In some applications, however, the ability to rotate the automated instrument 401 around its longitudinal axis is important. For such applications, a rotational actuator 700 may be provided as shown in FIG. 9. In these applications, the rotational actuator 700 acts as the instrument clamp 650. The rotational actuator 700 is firmly attached to the upper end of the actuating rod 632 with two set screws 701, 702. A linear motor 730 is arranged within the body of the rotational actuator. The linear motor 730 is adapted to move a gear rack 740 which is arranged perpendicular to the actuating rod 632. The gear rack 740 engages a pinion gear 750. The pinion gear 750 has a central hole 741 through which the automated instrument 401 can be inserted. The central hole 751 is aligned with an upper body opening 705 and a lower body opening 706 in the housing of the rotational actuator 700. The pinion gear 750 is held within a bearing in the housing of the rotational actuator 700. An upper portion of the automated instrument 401 and the central hole 751 may have a non-round cross-sectional shape to allow axial sliding of the automated instrument 401 through the central hole 751 during setup of the robot, but prevent rotation of the automated instrument 401 relative to the central hole 751.

When in use, a blind set screw 753 may be used to clamp the automated instrument 401 to the pinion gear 750. For redundancy, two or more blind set screws 753 may be used, circumferentially spaced from one another within threaded openings in the pinion gear 750. When clamped to the pinion gear 750, the automated instrument 401 can no longer slide relative to the actuating rod 632 and no longer rotate relative to the pinion gear 750.

A sliding marker 661 may be attached to the actuated instrument 401 and may be used in combination with the scale 621 to show the longitudinal travel of the actuated instrument 401. When used in combination with the rotational actuator 700 the sliding marker 661 may be formed as an O-ring to allow rotation of the actuated instrument 401 in front of the scale 621.

The linear motor 730 may be a piezo-electrical linear actuator as described above. Rotation of the automated instrument 401 need not be based on a rack and pinion mechanism but can also be implemented with a rotating piezoelectric motor. In that case, the pinion gear is replaced with a rotating core of a slip-stick piezoelectric motor.

Typically, a 4-axis robot 200 for guiding an instrument or an advanced 5- or 6-axis robot 201 for driving an instrument are used after an image, such as an MRI or a CT scan of a patient 100, has been captured. Within the captured image a specific target 101 will have been identified within the patient 100 into which the instrument 400, 401 should be guided or automatically driven.

Preferably, the image is a three-dimensional representation of the patient 100 within an image coordinate system. Markers may have been placed on the patient and are visible in the 3D-image to provide anchor points for the image coordinate system. The 3D image is presented to a surgeon on a display screen.

The robot 200, 201 is operatively connected to the same display screen. The path of the instrument 400, 401 as defined by the position of the robot's actuators is visually depicted on the same display screen and preferably overlaid on top of the 3D image of the patient. This requires that the robot's orientation and the patient image are in a known and fixed relative relationship. This can be achieved by securing the patient relative to the robot, e.g. by attaching the robot directly to the patient or by securing both the patient and the robot to a common structure such as the patient table 102.

Figure 6:
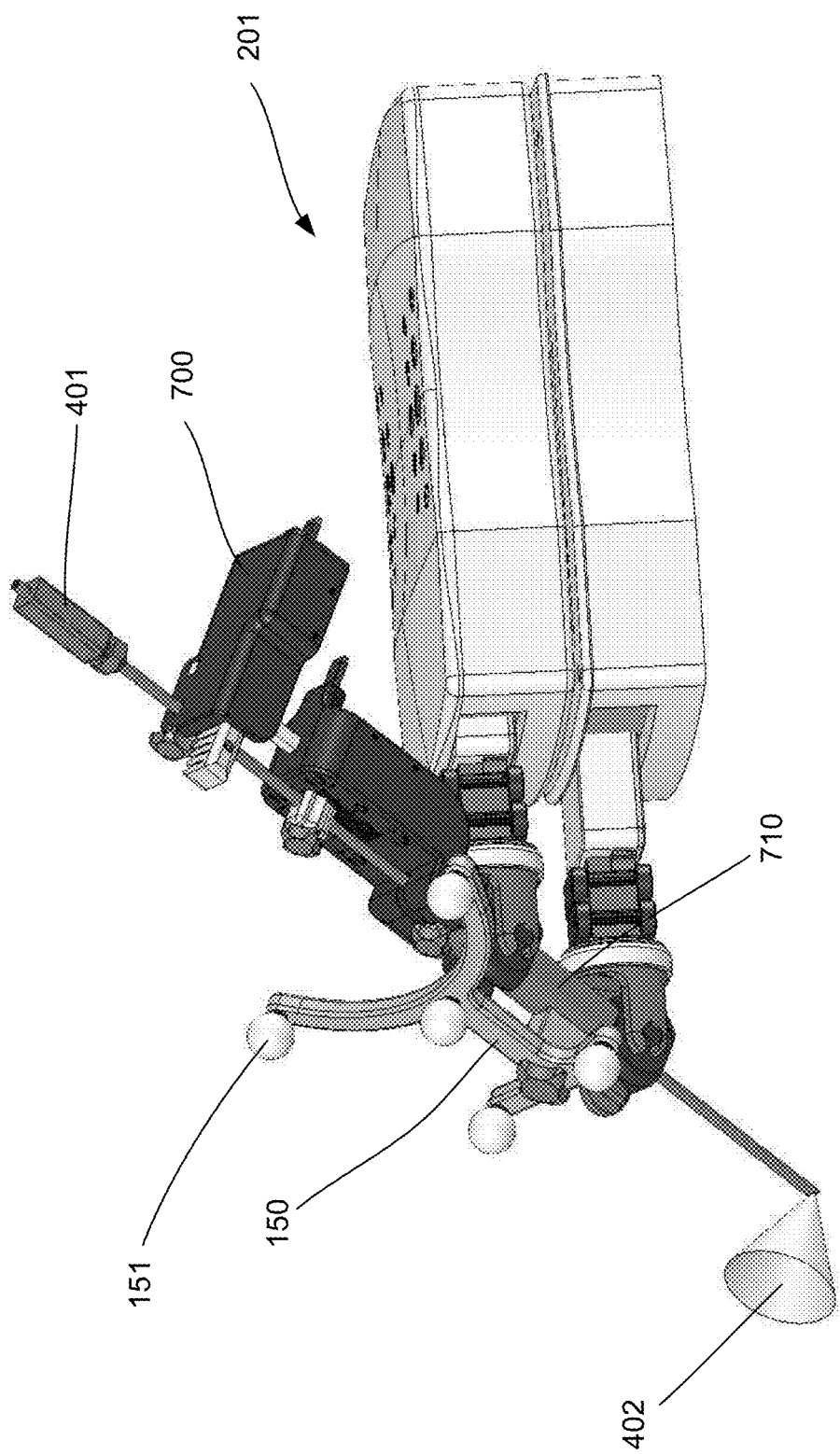
FIG. 6 shows an advanced 6-axis medical robot including a linear and a rotational instrument actuator.

Next, the relative position of the robot and the patient must be calibrated to establish the correlation between the robot coordinate system and the 3D image coordinates. For this purpose, a positioning frame 150 with several positioning markers 151 may be attached to the guide tube 710 as shown in FIG. 6. The positioning markers 151 may be observed by a camera which correlates the position of the markers 151 with the position of markers attached to the patient, allowing to create a common reference for both the patient image and the robot placement.

When in use, the lower actuator arm may first be adjusted to position the instrument 400, 401 above a desirable incision point on the patient 100. Next, the upper actuator arm 212 may be adjusted to define pitch and roll of the instrument 400, 401. The projected path of the instrument may be displayed on the display screen and the actuators may, either one at a time or synchronously, be adjusted until the projected path aligns with the target 101 in the patient 100.

In a guided operating mode without linear actuator 600 the surgeon may than manually push the guided instrument 400 into the target 101, possibly observing progress of the instrument 400 on a life image on the display screen.

In an automatic operating mode with a linear actuator 600, the surgeon may activate the linear actuator 600 after confirming the projected path of the instrument. For safety reasons, an electronic lockout may be provided that prevents activation of the linear actuator 600 until the path of the actuator has been positively confirmed by a surgeon.

Figure 22:
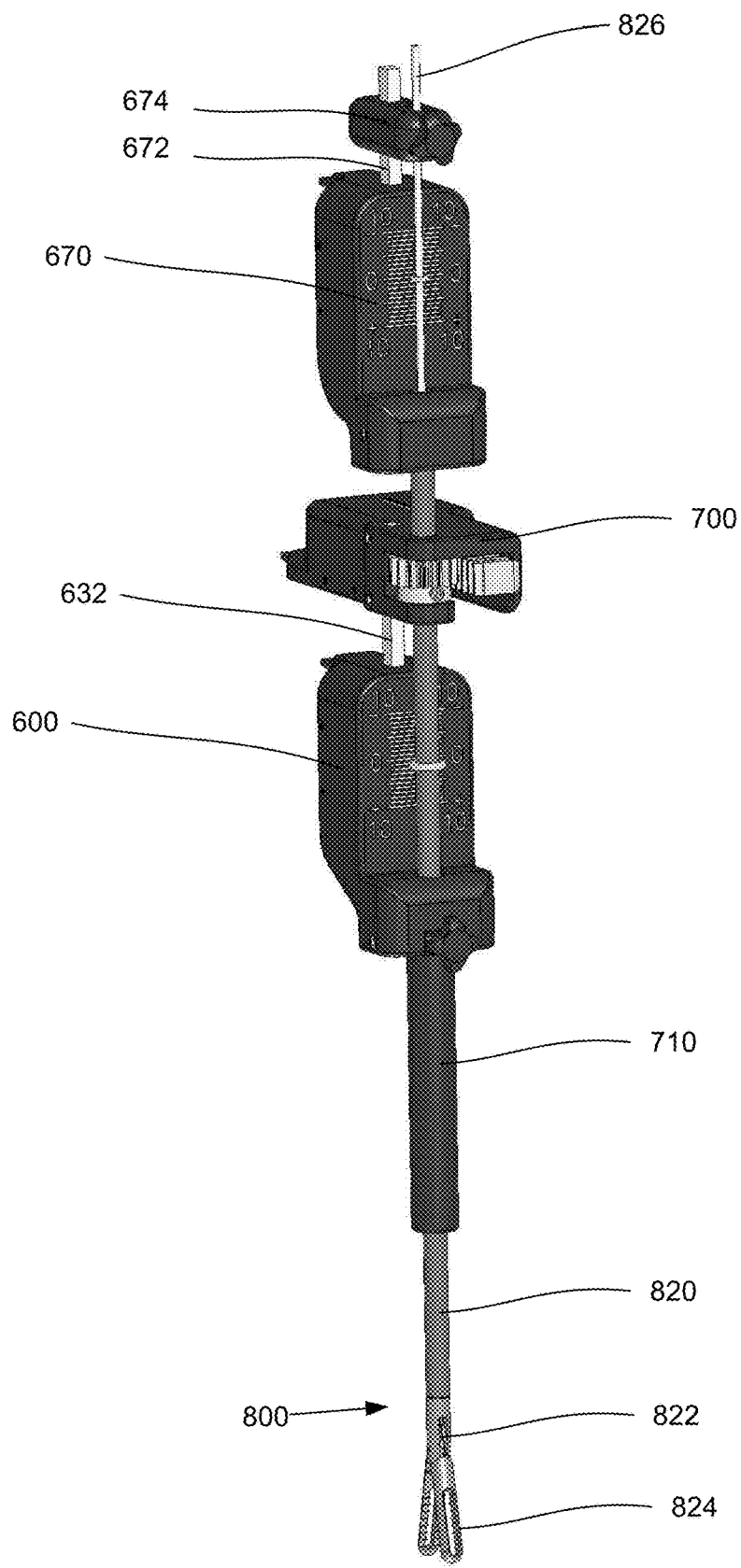
FIG. 22 shows a medical grasper instrument which is manipulated by two linear actuators and one rotational actuator.
Figure 23:
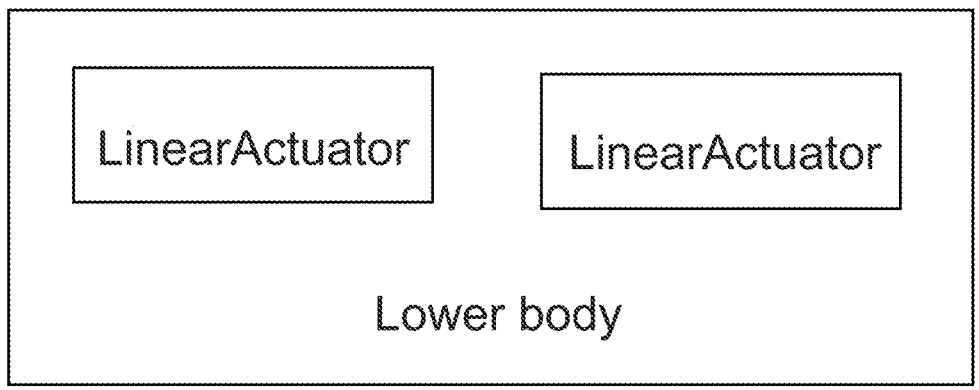
FIG. 23 schematically shows linear actuators in a lower body.

In some applications, it may be desirable to control even more motions of a medical instrument. One exemplary such application is illustrated in FIG. 22. Here, a medical instrument in form of a grasper 800 is shown. The grasper 800 has an outer hollow tubular shaft 820 having two alligator graspers 824 hingedly connected thereto at a lower end. An inner solid cylindrical shaft 826 is provided and operatively connected to the alligator graspers 824, which open and close in response to the inner solid cylindrical shaft 826 being moved relative to the outer hollow tubular shaft 820.

Similar to the automated instrument 401 shown in FIG. 6 and FIG. 9, the grasper 800 can slide and rotate within a guide tube 710 which may be connected to a medical robot as shown in FIG. 6. The outer hollow tubular shaft 820 of the grasper 800 is securely clamped into a pinion gear of a rotational actuator 700. The rotational actuator 700 can control the rotation of the grasper 800 within the guide tube 710.

The rotational actuator 700 is arranged on an actuating rod 632 the linear movement of which is controlled by a lower linear actuator 600. The lower linear actuator 600 can move the grasper 800 long its longitudinal axis within the guide tube.

An upper linear actuator 670 is provided and firmly attached to an upper end of the hollow tubular shaft 820. The upper linear actuator 670 thus moves and rotates with the grasper 800. The upper linear actuator may be of the same type as the lower linear actuator 600, except of a receiving opening for the hollow tubular shaft 820 in the upper linear actuator 670 having a smaller diameter than the corresponding receiving opening for the guide tube 710 in the a lower linear actuator 600. The upper linear actuator is configured to move an upper actuating rod 672. An inner shaft clamp 674 is provided and firmly attached to the upper actuating rod 672. When in use, the inner solid cylindrical shaft 826 of the grasper 800 is clamped to the upper actuating rod 672 with the inner shaft clamp 674. The upper linear actuator 670 can thus move the inner solid cylindrical shaft 826 relative to the outer hollow tubular shaft 820 and thereby open and close the alligator graspers 824.

One skilled in the art will immediately recognize that the medical robot is not limited to use with alligator graspers can be used with any kind of grasper and also with laparoscopy instruments, including but not limited to a punch, a rongeur, scissors, a cutter, and the like.

Also, one skilled in the art will recognize that even move complex instruments can be manipulated by providing additional rotational and linear actuators. For example, an even more complex medical instrument may comprise an outer hollow tubular shaft, an inner hollow tubular shaft, and a center solid cylindrical shaft. In such a configuration the position, pitch and yaw of the outer hollow tubular shaft can be controlled by moving a lower and upper actuator arm of a medical robot. The linear movement of the outer hollow tubular shaft relative to a guide tube can be controlled by a first linear actuator which is clamped onto the guide tube. The rotation of the outer hollow tubular shaft relative to the guide tube can be controlled by a first rotational actuator which may be clamped to the first linear actuator. The linear movement of the inner hollow tubular shaft relative to the outer hollow tubular shaft may be controlled by a second linear actuator which may be clamped onto the outer hollow tubular shaft. The rotation of the inner hollow tubular shaft relative to the outer hollow tubular shaft may be controlled by a second rotational actuator which may be clamped to the second linear actuator. Finally, the linear movement of the center solid cylindrical shaft relative to the inner hollow tubular shaft may be controlled by a third linear actuator which may be clamped onto the inner hollow tubular shaft. The rotation of the center solid cylindrical shaft relative to the inner hollow tubular shaft may be controlled by a third rotational actuator which may be clamped to the third linear actuator. That is, the capabilities of the medical robot as disclosed can be expanded by adding additional linear and/or rotational actuators in a cascading fashion.

Usage Methods

When used in combination with an ultrasonic transducer, the medical robot may be controlled to sweep along the horizontal field of view of the ultrasonic transducer to obtain an ultrasonic tomographic image. A method for generating a tomographic ultrasound image may include the following steps: 1. Provide a medical robot having an arm which is configured to receive an ultrasonic transducer. 2. Attach the ultrasonic transducer to the arm of the medical robot. 3. Cause the medical robot to move the ultrasonic transducer along a path. 4. Capture images from the ultrasonic transducer. 5. Associate the images captured from the ultrasonic transducer with position information of the arm of the medical robot. 6. Process the captured images and associated position information to derive a tomographic ultrasonic image.

When used in combination with a medical robot capable of automatically adjusting both the x/y position and the pitch and roll of an ultrasonic transducer, a tomographic ultrasonic image may be generated as follows: 1. Provide a medical robot having a lower arm movable in a lower x/y plane and an upper arm movable in a parallel upper x/y plane, the lower arm and the upper an arm being configured to receive an ultrasonic transducer. 2. Attach the ultrasonic transducer to the lower arm and to the upper arm of the medical robot. 3. Cause the medical robot to position the ultrasonic transducer at a desirable position by movement of both the lower arm and the upper arm. 4. Cause the medical robot to adjust the pitch and/or roll of the ultrasonic transducer by movement of the upper arm while the lower arm remains in place. 5. Capture images from the ultrasonic transducer. 6. Associate the images captured from the ultrasonic transducer with position information relating to the position of the upper arm. The position of the upper arm is inherently also related to the pitch and roll of the ultrasonic transducer. 7. Process the captured images and associated position information to derive a tomographic ultrasonic image.

The process as described above may e.g. be used to create a tomographic ultrasound image of a patient's chest. In that case, the ultrasonic transducer may first be oriented substantially perpendicular to the x/y axis. The lower arm and the upper arm may then be simultaneously driven to place the ultrasonic transducer in a position such that its field of view extends between two of the patient's ribs. The pitch and roll of the ultrasonic transducer may then be varied, e.g. by causing a movement of the upper arm along a serpentine path, to generate a tomographic ultrasound image of the chest cavity through the opening between the two ribs.

Sterile Barrier

To prevent infections, it is important to maintain a sterile operating area. This applies in particular around the incision where a medical instrument that is guided or actuated by the medical robot pierces a patient's skin. Sterilizing the medical robot 200 may however be time consuming and practically challenging, given its inevitable mechanical complexity. It may thus be more economical to separate a sterile operating area around the incision from a non-sterile area and place at least parts of the medical robot 200 in the non-sterile area.

Figure 19:
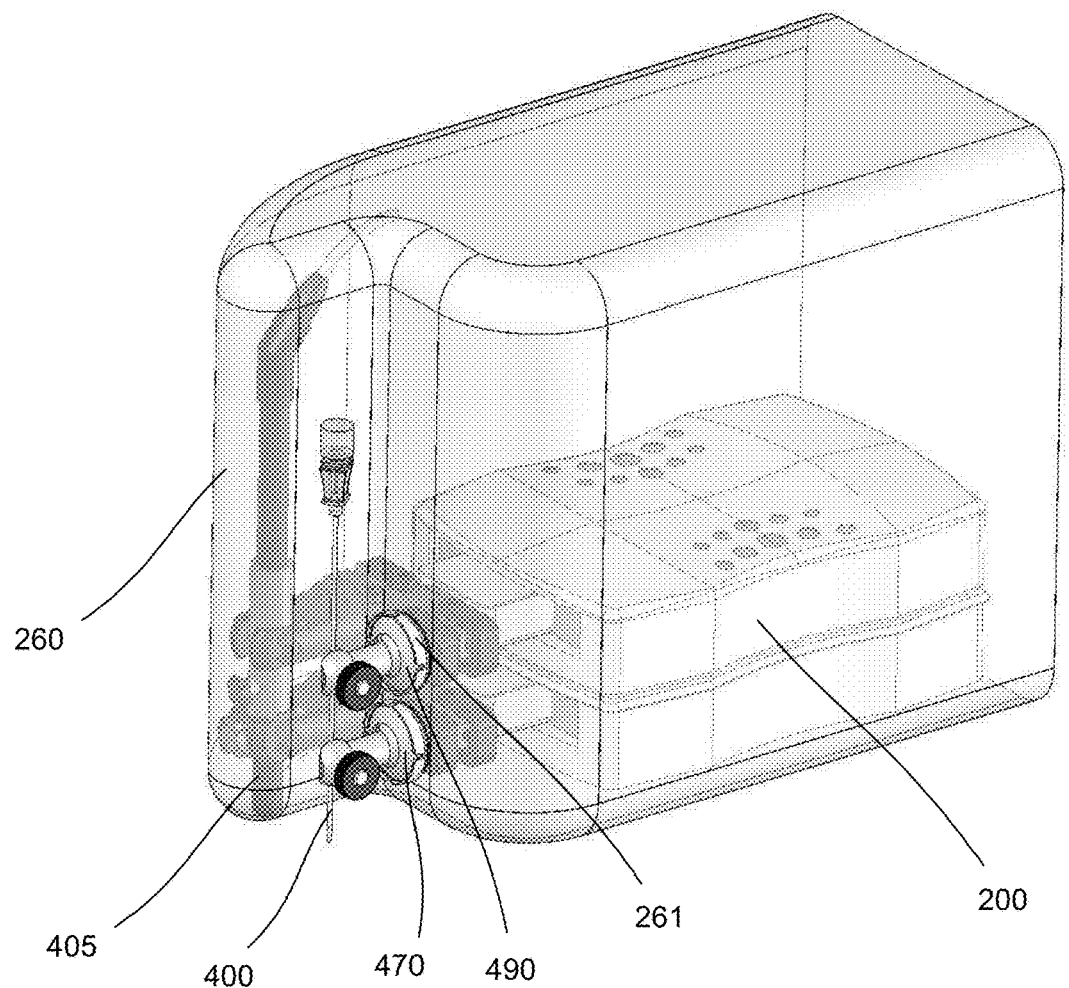
FIG. 19 shows a medical robot within a sterile bag.

As shown in FIG. 19, a sterile barrier may be provided to separate a sterile operating area from non-sterile portions of the medical robot 200. The sterile barrier may e.g. be made of an elastic film and may be formed as a sterile bag 260. The shape of the sterile bag 260 may be adapted to the configuration of the robot 200. As shown, grommets 261 may be formed around openings in the sterile bag 260. The grommets 261 are shaped such that they can clip onto a rear portion of the gimbal mounts 470, 490. In the configuration as shown in FIG. 19, the upper gimbal mount 490, the lower gimbal mount 470, the instrument 400 and the bag 260 with its grommets 261 have to be sterilized before use. Alternatively, these parts may be manufactured and packaged in a sterile environment for one-time use and discarded after an operation. The body of the robot 200, the instrument adaptor, and an ultrasonic transducer 405 that is attached to a second instrument guide are all arranged within the sterile bag 260 shielded from the operating area and thus do not need to be sterilized.

The sterile barrier is preferably made of a thin sterile film to allow an ultrasonic transducer to work through the sterile barrier. Before use, an ultrasound gel may be disposed both inside and outside of the sterile bag 260 to aid the operation of the ultrasonic transducer.

Figure 20:
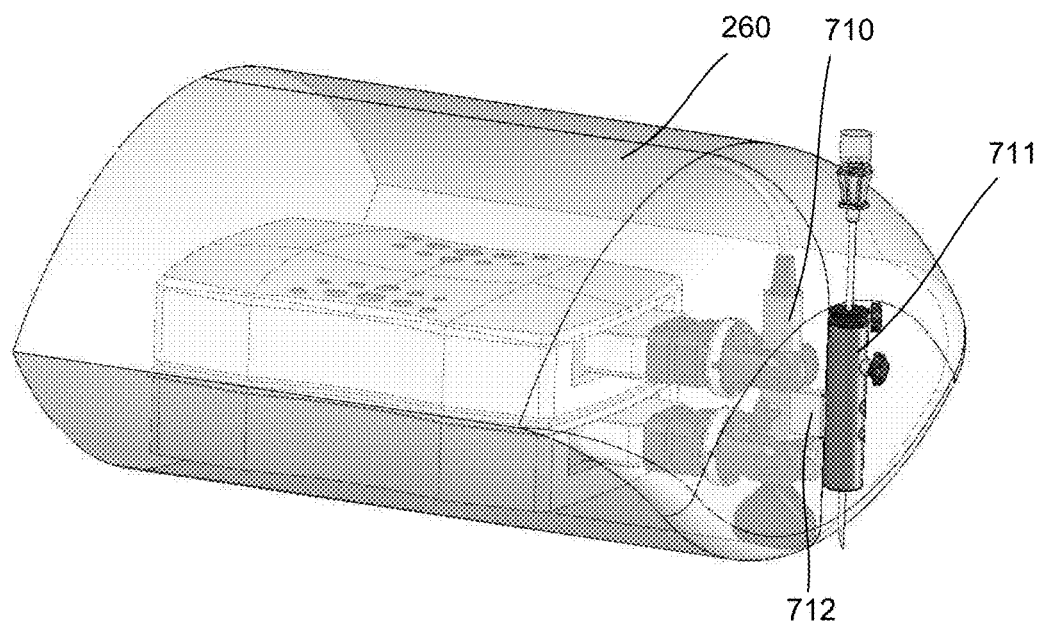
FIG. 20 shows a differently configured medical robot within a sterile bag.

The sterile barrier may be arranged in various different configurations. Small portions of the sterile barrier and its grommets are shown in FIG. 7, FIG. 12, FIG. 14, and FIG. 16. The sterile bag 260 is air-tight and eliminates or reduces the need to sterilize portions of the robot 201 which are inside the sterile bag 260. A configuration which uses a sterile bag 260 in an embodiment with two parallel guide tubes is shown in FIG. 20. As shown, the sterile bag 260 provides a sterile barrier between the first guide tube 710 and the second guide tube 711. An opening in the sterile bag 260 seals around the spacer element 712 which connects the first guide tube 710 to the second guide tube 711.

The invention claimed is:

1. A medical robot, comprising:
   a lower actuator arm movable within a lower plane
   a lower gimbal mount attached to the lower actuator arm, the lower gimbal mount having at least two degrees of freedom allowing pitch and roll within the lower plane;
   an upper actuator arm movable within an upper plane;
   an upper gimbal mount attached to the upper actuator arm, the upper gimbal mount having at least two degrees of freedom allowing pitch and roll within the upper plane;
   a guide tube attached to the lower gimbal mount and to the upper gimbal mount;
   a linear actuator attached to the guide tube, the linear actuator being adapted to longitudinally move a medical instrument which extends through the guide tube;
   a lower instrument adaptor having a rear portion which is firmly attached to the lower actuator arm and a receiving opening which receives an attachment shaft of the lower gimbal mount; and
   an upper instrument adaptor having a rear portion which is firmly attached to the upper actuator arm and a receiving opening which receives an attachment shaft of the upper gimbal mount,
   wherein the attachment shafts of the lower gimbal mount and the upper gimbal mount each comprise two circumferential grooves, and
   wherein the attachment shafts of the lower gimbal mount and the upper gimbal mount are retained within the respective receiving openings of the upper instrument adaptor and the lower instrument adaptor by two spring-loaded securing brackets each, the spring-loaded securing brackets having retaining pins which engage the circumferential grooves.

2. The medical robot as in claim 1,
wherein the guide tube is firmly attached to the lower gimbal mount and slidably arranged within the upper gimbal mount.

3. The medical robot as in claim 2, wherein the lower gimbal mount comprises an inner gimbal element with a threaded opening through which a screw clamps a lower end of the guide tube to the inner gimbal element.

4. The medical robot as in claim 1, wherein the linear actuator comprises
a lower body portion which extends around an upper end of the guide tube and a main body portion arranged at a lateral offset from the lower body portion.

5. The medical robot as in claim 1,
wherein a receiving opening is formed within a lower body portion of the linear actuator, and
wherein a clamping screw is provided to securely clamp the lower body portion of the linear actuator to an upper end of the guide tube.

6. The medical robot as in claim 5,
wherein the medical instrument extends through the lower body portion of the linear actuator.

7. The medical robot as in claim 1, wherein the linear actuator comprises:
an actuating rod;
an instrument clamp firmly attached to the actuating rod; and
a linear motor arranged within a main body portion of the linear actuator, the linear motor being adapted to move an actuating rod.

8. The medical robot as in claim 7, wherein the linear motor is a piezo-electrical linear actuator.

9. The medical robot as in claim 7, wherein a longitudinal axis of the actuating rod extends radially offset from and in parallel with a longitudinal axis of the guide tube.

10. The medical robot as in claim 1, wherein the linear actuator comprises:
an actuating rod;
a linear motor arranged within a main body portion of the linear actuator, the linear motor being adapted to move the actuating rod; and
a rotational actuator firmly connected to the actuating rod.

11. The medical robot as in claim 10, wherein the rotational actuator comprises a pinion gear, the pinion gear having a central opening through which the medical instrument can be inserted and into which the medical instrument can be releasably clamped.

12. The medical robot as in claim 11, wherein the rotational actuator further comprises a gear rack which engages the pinion gear, the gear rack being adapted to be moved by a linear motor arranged within a housing of the rotational actuator.

* * * * *